US011020770B1

(12) United States Patent
Tilekar et al.

(10) Patent No.: US 11,020,770 B1
(45) Date of Patent: Jun. 1, 2021

(54) CONTAINER CHUTES FOR SORTATION SYSTEMS

(71) Applicant: Amazon Technologies, Inc., Seattle, WA (US)

(72) Inventors: Akshay Rajendra Tilekar, Snoqualmie, WA (US); Justin Stone, Frisco, TX (US); Jon David DeFant, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/710,930

(22) Filed: Dec. 11, 2019

(51) Int. Cl.
| | | |
|---|---|---|
| B07C 3/08 | (2006.01) | |
| B65G 35/06 | (2006.01) | |
| B65G 11/12 | (2006.01) | |
| B65G 47/44 | (2006.01) | |
| B65G 51/02 | (2006.01) | |
| B07C 5/36 | (2006.01) | |
| B65G 17/34 | (2006.01) | |

(52) U.S. Cl.
CPC ............ B07C 3/087 (2013.01); B65G 11/123 (2013.01); B65G 35/06 (2013.01); B65G 47/44 (2013.01); B07C 5/363 (2013.01); B65G 17/345 (2013.01); B65G 51/02 (2013.01)

(58) Field of Classification Search
CPC ......... B07C 3/087; B07C 5/363; B65G 35/06; B65G 51/02; B65G 11/12; B65G 11/123; B65G 11/126; B65G 17/345; B65G 47/44; B65G 47/519
USPC .................................................. 198/370.06
See application file for complete search history.

(56) References Cited

U.S. PATENT DOCUMENTS

| | | | | | |
|---|---|---|---|---|---|
| 4,125,195 | A | * | 11/1978 | Sasadi .................. | B65G 11/126 141/284 |
| 4,815,582 | A | * | 3/1989 | Canziani .............. | B65G 17/345 104/119 |
| 5,588,520 | A | * | 12/1996 | Affaticati ................ | B61B 13/08 198/370.06 |
| 5,701,992 | A | * | 12/1997 | Enomoto ............. | B65G 17/345 198/370.06 |
| 6,276,509 | B1 | * | 8/2001 | Schuster ................. | B07C 3/008 198/370.02 |
| 6,478,138 | B1 | * | 11/2002 | Edwards .............. | B65G 17/345 198/370.06 |
| 8,839,945 | B2 | * | 9/2014 | Gruber ................. | B65G 1/1378 198/370.06 |

(Continued)

*Primary Examiner* — Mark A Deuble
(74) *Attorney, Agent, or Firm* — Eversheds Sutherland (US) LLP

(57) ABSTRACT

Systems, methods, and computer-readable media are disclosed for container chutes for sortation systems. In one embodiment, an example system may include a frame and a chute assembly coupled to the frame, where the chute assembly is configured to pivot from a first position to a second position with respect to the frame. The chute assembly may include a first planar ramp, a first support on a first side of the first planar ramp, and a second support on a second side of the first planar ramp. The chute assembly may include a first pneumatic lift component coupled to the first support and to the frame, and a second pneumatic lift component coupled to the second support and to the frame. The chute assembly may be held in the second position when the first pneumatic lift component and the second pneumatic lift component are in a compressed configuration.

19 Claims, 18 Drawing Sheets

(56) References Cited

U.S. PATENT DOCUMENTS

| | | | | |
|---|---|---|---|---|
| 2002/0170850 A1* | 11/2002 | Bonham | ............... | B65G 47/82 |
| | | | | 209/589 |
| 2017/0057756 A1* | 3/2017 | Dugat | ................... | B65G 47/54 |
| 2017/0197233 A1* | 7/2017 | Bombaugh | ............... | B07C 5/36 |
| 2019/0161286 A1* | 5/2019 | Hughes | ............... | B65G 11/183 |
| 2020/0071097 A1* | 3/2020 | Berg | ................... | B65G 11/123 |

* cited by examiner

CONTAINER CHUTES FOR SORTATION SYSTEMS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
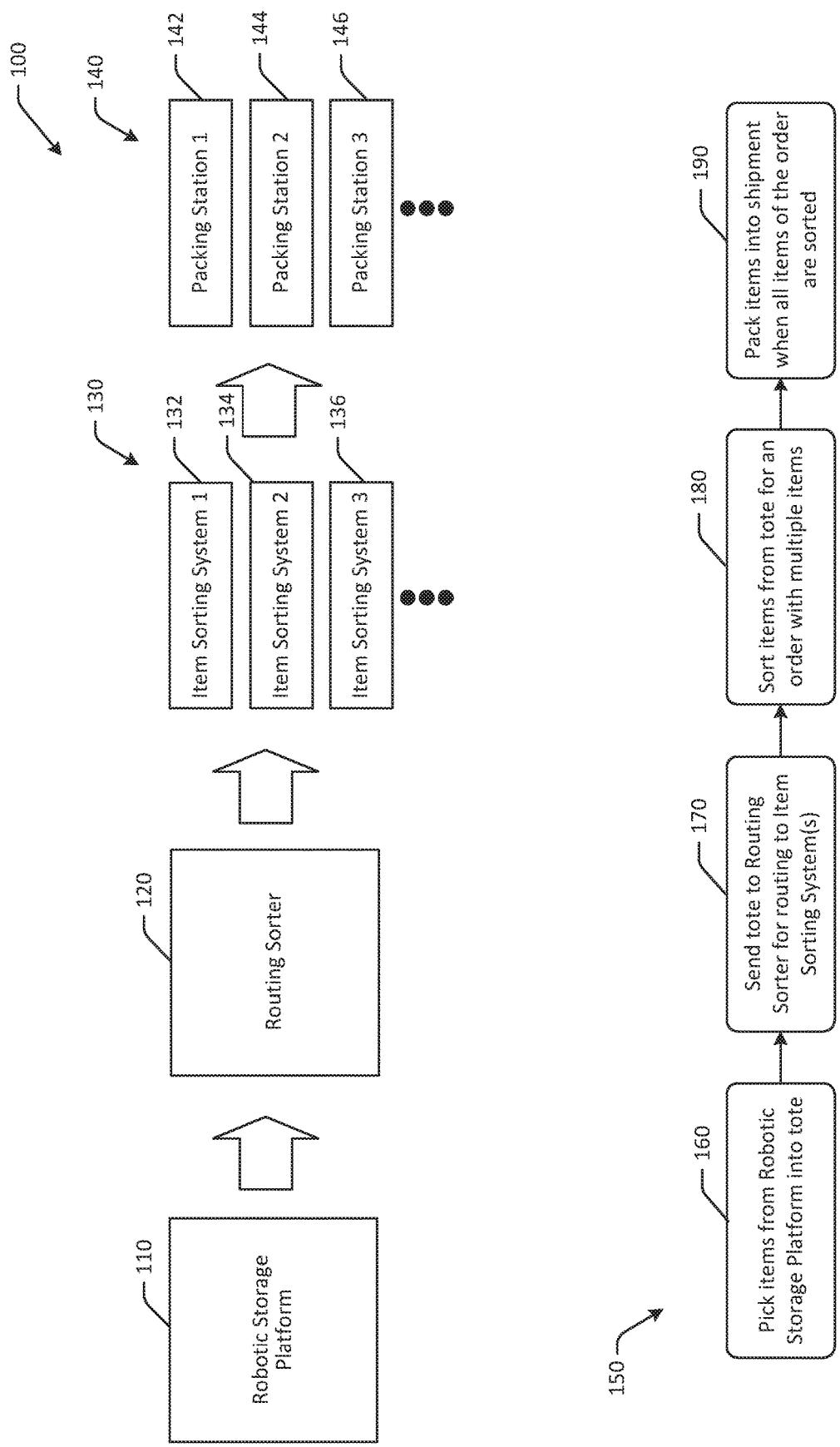
FIG. 1 is a hybrid schematic illustration of an example use case for flexible container chutes for sortation systems and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted.

Embodiments of the disclosure include methods and systems for automated item sorting that may improve processing and fulfillment of multi-item orders, or orders that include more than one item. Certain embodiments include item sorting systems with flexible containers and flexible container chutes that can be used to direct items or packages into flexible containers, so as to increase throughput and speed of consolidating items for multi-item orders and/or consolidating packages that are destined for certain related destinations. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Certain embodiments may use flexible containers, such as bags or totes that are flexible, to hold items, such as products for multi-item orders, or packages, such as packages that are to be shipped. To direct items or packages into the flexible containers, certain embodiments may include flexible container chutes. Flexible container chutes may be chute assemblies with adaptable interfaces that can be used to improve sort density at item sorting machines or systems. Flexible chute assemblies may include configurable racks that can be modified to support various space configurations (e.g., height, width, number of ramps/flexible containers, etc.). The flexible chute assemblies may be configured to direct items or packages into flexible containers, carts, or other containers. Flexible containers may increase yield relative to rigid containers, such as boxes. For example, a box of a certain size may have a yield of about 15 packages per box, whereas a flexible container of similar size may yield 35 packages per bag. In addition, containers such as boxes may be single use, whereas certain flexible containers may be multi-use. Flexible containers and flexible container chute assemblies may be used with various sortation systems, such as item sorting systems configured to handle items or packages of up to, or more than, 100 pounds.

Referring to FIG. 1, an example use case 100 for flexible container chutes for sortation systems and an example process flow in accordance with one or more embodiments of the disclosure. Although discussed in the context of online orders, other embodiments may be directed to any suitable use case where products are picked and sorted, or packages are sorted, such as instances where users may pick up orders rather than receiving a shipment.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine. For example, a certain tote may be associated with a certain item sorting system, such that products that are designated to be picked and placed in the tote are for orders that are to be consolidated at that particular item sorting system. The association between the tote and the item sorting system may be static.

At the routing sorter 120, totes including products that have been picked may be routed to the appropriate or designated item sorting system. For example, the routing sorter 120 may determine an identifier associated with the tote, and may determine one or more item sorting systems to which the tote is to be routed using the identifier. The routing sorter 120 may route or direct the tote to the appropriate item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for multi-item orders. For example, a first tote may include a first item of a multi-item order, and a second tote may include a second item of the multi-item order. The item sorting system may therefore identify the orders associated with the respective products in a tote, and may transport the products to a container, such as a flexible container, associated with the order. When the order is complete with all of the products in the associated flexible container, the order may be packed. Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate flexible containers for the orders for which the products were picked. Example item sorting systems are discussed with respect to at least FIGS. 3-9.

After a multi-item order is complete (e.g., the item sorting system has delivered all of the products in the order to the appropriate flexible container, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
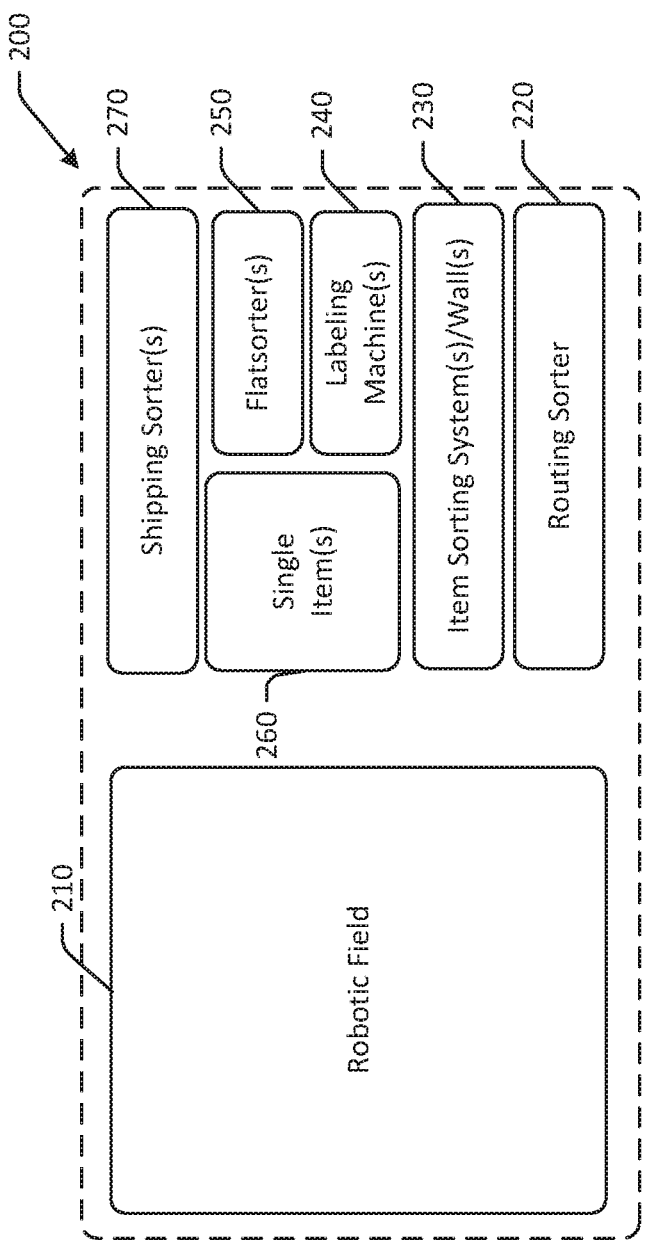
FIG. 2 is a hybrid schematic illustration of an example use case for flexible container chutes for sortation systems in accordance with one or more embodiments of the disclosure.

FIG. 2 is a hybrid schematic illustration of an example use case for flexible container chutes for sortation systems in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into flexible containers using flexible container chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include flexible containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. For example, manual induction of products from a tote to a sorter machine may be a bottleneck that is avoided by the systems and methods described herein. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"× 14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of flexible containers (e.g. induct individual items from a container that has multiple items, and place the inducted items into the appropriate flexible container, where flexible containers are associated with multi-item orders. The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types.

Accordingly, in some embodiments, item sorting systems may be arranged in rows and may receive assigned totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Embodiments of the disclosure include flexible container chutes for sortation systems. The flexible container chutes may allow for use of flexible containers instead of rigid containers. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
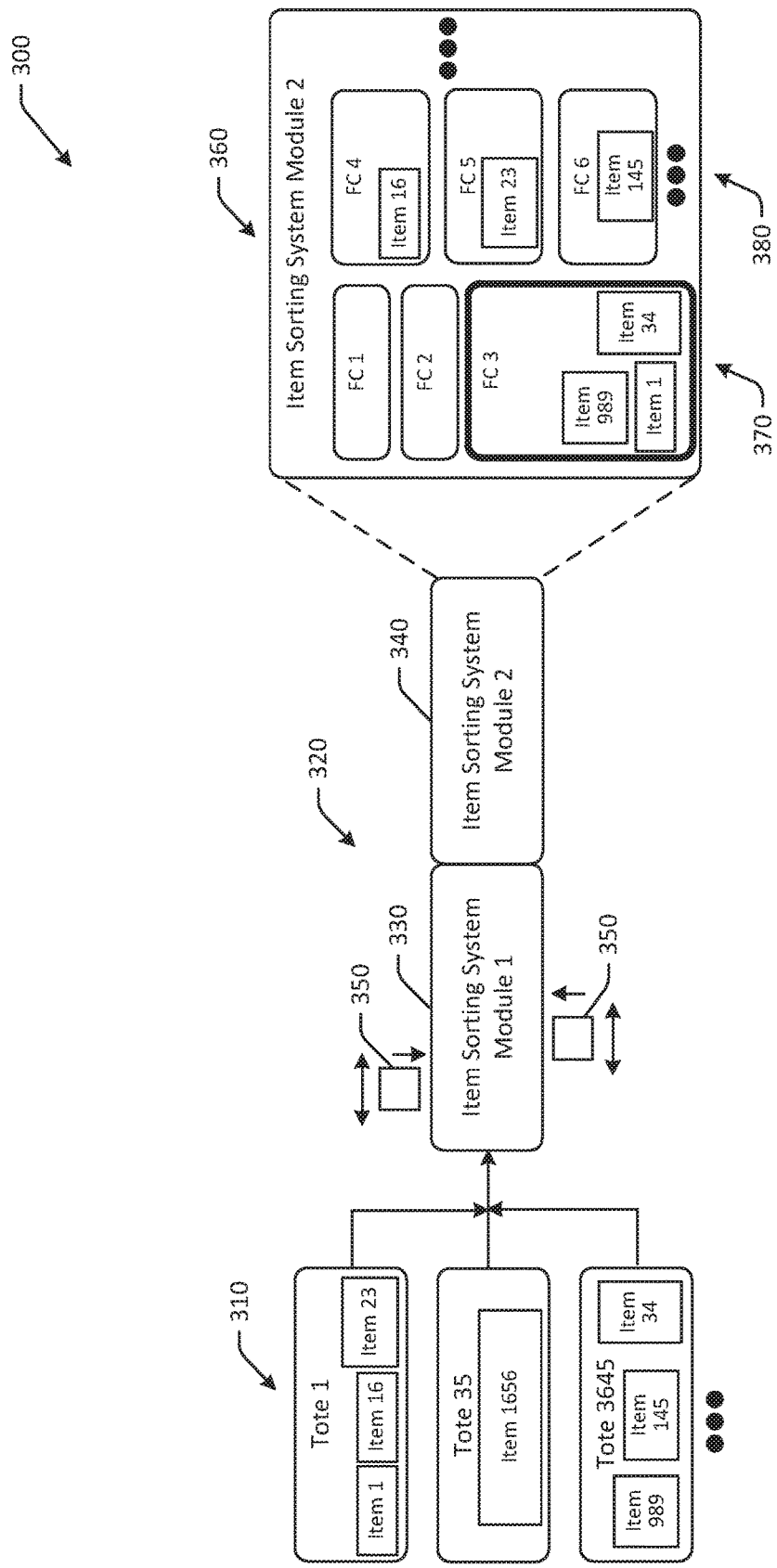
FIG. 3 is a schematic illustration of an item sorting system and additional components in accordance with one or more embodiments of the disclosure.

FIG. 3 is a schematic illustration of an item sorting system and additional components in accordance with one or more embodiments of the disclosure. Other embodiments may include additional or fewer components. The illustration of FIG. 3 is not to scale, and may not be illustrated to scale with respect to other figures. The item sorting system illustrated in FIG. 3 may be the same item sorting system discussed with respect to FIGS. 1-2.

In FIG. 3, an example use case 300 including a set of totes 310 and an item sorting system, or a multi-module item sorting machine 320, is depicted. The set of totes 310 may include one or more totes that may optionally be assigned to, or otherwise routed to, the item sorting system 320. For example, Tote 1, Tote 35, Tote 3645, and so forth may be routed to the item sorting system 320. The totes may have identifiers, such as alphanumeric or other identifiers. The totes may be used to place items that have been picked into the totes. The items that are placed in the totes may be associated with orders that are to be consolidated by the item sorting system 320. For example, Tote 1 may include item 1, item 16, and item 23, Tote 35 may include item 1656, Tote 3645 may include item 989, item 145, and item 34, and so forth. The item sorting system, or the item sorting machines 320, may be configured to receive items from a tote that includes one or more, such as multiple items, and the tote may be assigned to, or otherwise routed to, the item sorting system or the item sorting machine 320.

The totes 310 may be directed to the item sorting system 320 for sorting and consolidation. For example, items in the totes 310 may be inducted into the item sorting system 320 via a conveyor belt.

The item sorting system machine 320 may include one or more modules, and may be adjusted in size by adding or removing modules as needed. For example, the item sorting system 320 may include a first modular item sorting machine 330 and a second modular item sorting machine 340. The second modular item sorting machine 340 may be coupled to the first modular item sorting machine 330.

The first modular item sorting machine 330 may include a first support disposed on a first side of the first modular item sorting machine 330, and a second support disposed on the first side of the first modular item sorting machine 330. One or more flexible container chutes may be coupled to one or more sides of the first modular item sorting machine 330 and/or the second modular item sorting machine 340, as illustrated in FIGS. 4-9. The first modular item sorting machine 330 may include a first flexible container positioned at a first location, and a second flexible container positioned at a second location. The first flexible container and the second flexible container may have the same dimensions or different dimensions. In some embodiments, flexible containers and corresponding flexible container chutes may be disposed about more than one side of the first modular item sorting machine 330.

The second modular item sorting machine 340 may include a third support disposed on the first side of the second modular item sorting machine 340, and a fourth support disposed on the first side of the second modular item sorting machine 340. One or more flexible container chutes may be coupled to one or more sides of the second modular item sorting machine 340. The second modular item sorting machine 340 may include a third flexible container positioned at a first location, and a fourth flexible container positioned at a second location. The third flexible container and the fourth flexible container may have the same dimensions or different dimensions, and may have different dimensions than the first flexible container and/or the second flexible container. The first flexible container, the second flexible container, the third flexible container, and/or the fourth flexible container can be rearranged in different vertical or horizontal locations and/or coupled to different flexible container chutes, and may be configured to receive packages, items of orders comprising multiple items, or other items. In some embodiments, flexible containers and corresponding flexible container chutes may be disposed about more than one side of the second modular item sorting machine 340.

The respective modules of the item sorting system machine 320 may include one or more flexible containers, or containers that hold multiple items. For example, as illustrated in side view 360, the second modular item sorting machine 340 may include a first set of flexible containers 370 disposed under a first flexible container chute, and a second set of flexible containers 380 disposed under a second flexible container chute. The flexible containers coupled to the respective chutes may be of different sizes or dimensions. The item sorting system machine 320 may include a plurality of flexible containers disposed in an array or other arrangement along one or more sides of the first modular item sorting machine 330 and the second modular item sorting machine 340. The respective flexible containers may be configured to be repositioned within different chutes and/or at different vertical or horizontal locations. In FIG. 3, Flexible container 1 and Flexible container 2 may have the same dimensions, while Flexible container 3 in the same column or chute may have a different dimension. Any suitable number of flexible containers may be included in a chute and/or array.

Items or packages inducted (e.g., from the totes 310, from a conveyor belt, etc.) may be sorted and directed to a flexible container associated with the item or package. The items may be transported by one or more shuttles 350, which may move in one or more directions within the item sorting system machine 320. In some embodiments, the shuttles 350 may be positioned outside of the item sorting system machine 320.

For example, Item 1 may be inducted from Tote 1 and placed in Flexible container 3, along with Item 989 and Item 34 from Tote 3645. Flexible container 3 may be associated with an order that included those three items, and may therefore be ready for packing. Similarly, Item 16 may be routed to Flexible container 4, Item 23 may be routed to Flexible container 5, Item 145 may be routed to Flexible container 6, and so forth. Any number of flexible containers, totes, and/or modules may be included.

Figure 4:
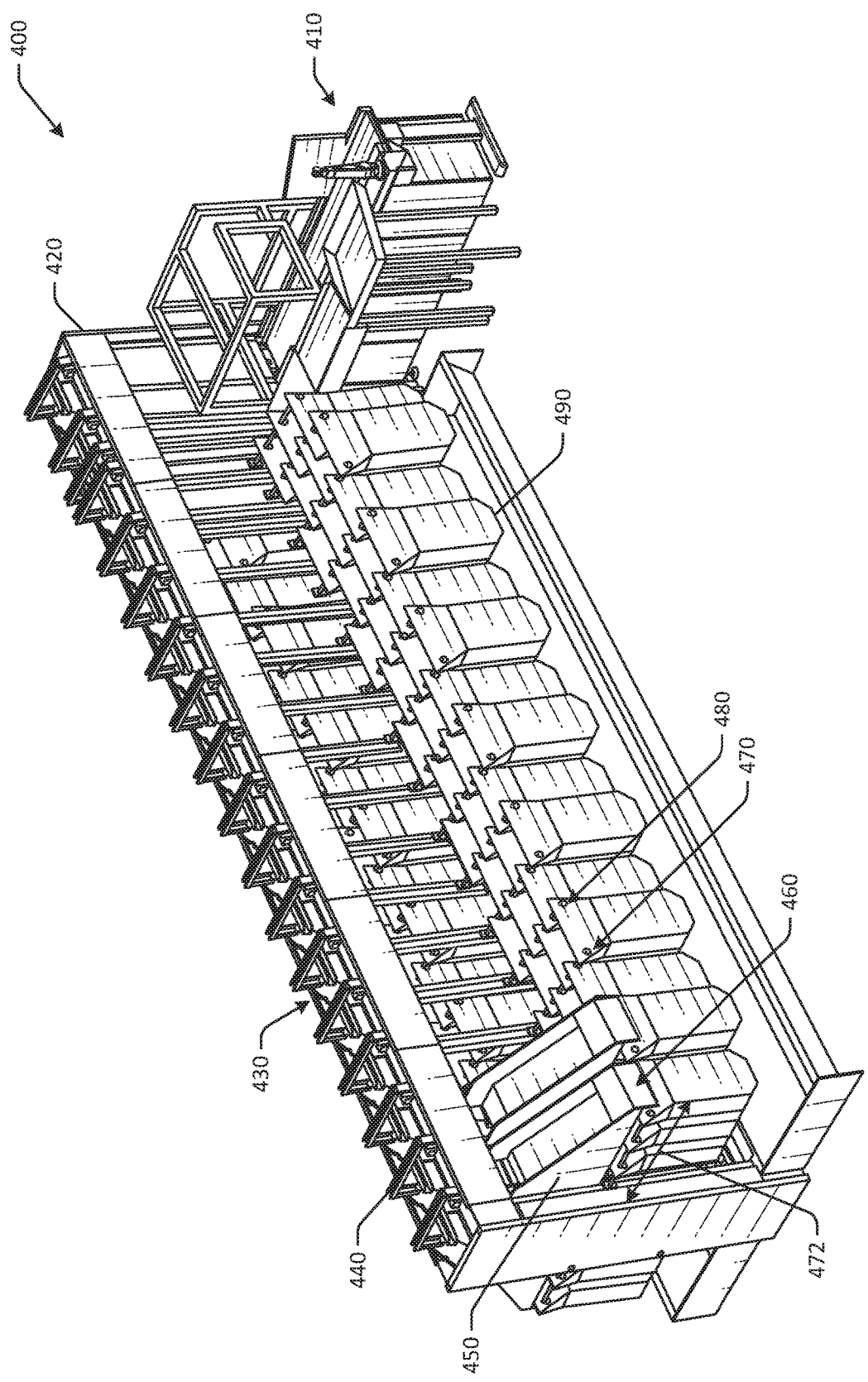
FIG. 4 is a schematic illustration of a perspective view of an item sorting system in accordance with one or more embodiments of the disclosure.

FIG. 4 is a schematic illustration of a perspective view of an item sorting system 400 in accordance with one or more embodiments of the disclosure. Other embodiments may include additional or fewer components. The illustration of FIG. 4 may not be to scale, and may not be illustrated to scale with respect to other figures. The item sorting system illustrated in FIG. 5 may be the same item sorting system discussed with respect to FIGS. 1-4.

In FIG. 4, the item sorting system 400 may include an induction portion 410 at which items, such as products or packages, may be inducted into the item sorting system 400. The induction portion 410 may include a conveyor belt that inducts items into the item sorting system 400 for sortation into flexible containers. Items may be retrieved or received from the induction portion 410 by one or more shuttles, such as crossbelt shuttles, that may transport items from the induction portion 410 to a designated flexible container via a flexible container chute.

The item sorting system 400 may include a frame 420 that forms one or more pathways 430 for the shuttles to move vertically and/or horizontally through the frame 420. The pathways 430 may be internal with respect to an outside of the frame 420. The pathways 430 may have a width 440 that corresponds to a width of the frame 420. As the shuttles move within the frame 420, the shuttles may deposit items down one or more chutes, which may lead to a flexible container. The shuttles may then return to the induction portion 410 to retrieve or receive another item.

One or more flexible container chute assemblies may be coupled to the item sorting system 400. For example, a first flexible container chute assembly 450 may be coupled to the item sorting system 400. In some instances, the first flexible container chute assembly 450 may be coupled to the frame 420 or another component of the item sorting system 400.

The first flexible container chute assembly 450 may include one or more ramps that form chutes in a vertical arrangement. For example, a first ramp may form a first chute that leads to a first flexible container, a second ramp may be disposed on top of the first ramp and may form a second chute that leads to a second flexible container, and so forth.

The first flexible container chute assembly 450 may include sidewalls that guide items down the ramp and into the flexible container(s). In some embodiments, the first flexible container chute assembly 450 may include a top portion 460 that can be used to guide items deposited in a top-most ramp or chute into a flexible container to ensure that the items do not fall out of the chute. The top portion 460 may include an angled portion that covers a portion of the top of the first flexible container chute assembly 450, and a vertical portion that forms a front face of the first flexible container chute assembly 450. The top portion 460 may guide items into a flexible container. The first flexible container chute assembly 450 may have any suitable depth 472. An increase in depth 472 may result in space for additional flexible containers to be disposed under the first flexible container chute assembly 450. As illustrated in FIG. 4, more than one flexible container chute assembly may be coupled to the item sorting system 400. For example, a second flexible container chute assembly may be disposed adjacent to the first flexible container chute assembly 450. The second first flexible container chute assembly may have the same or different dimensions as the first flexible container chute assembly 450, and may include the same or a different number of ramps.

One or more flexible containers 490 may be used with the item sorting system 400. The flexible containers 490 may be flexible bags, flexible totes, or other flexible containers. The flexible containers 490 may be formed of plastic, fabric, mesh, synthetic materials, or any other suitable material that provides a non-rigid outside surface. The flexible containers 490 may not have a predefined shape or geometry in some instances.

The flexible containers 490 may be coupled to one or more extendable arms. For example, the flexible containers 490 may include holes that may be optionally reinforced (e.g., with grommets, rivets, etc.). The holes may be used to slide the flexible containers 490 onto, for example, a first extendable arm 470 and a second extendable arm 480. The extendable arms 470, 480 may be extended by pulling or actuating a device to extend the arms away from the item sorting system 400. In the extended positon, flexible containers 490 can be placed on, or removed from, the respective extendable arms 470, 480. For example, when a flexible container is full, the extendable arms 470, 480 on which the flexible container is mounted may be pulled out (e.g., automatically or manually, etc.), and the full flexible container may be removed from the arms and replaced with an empty flexible container. The extendable arms 470, 480 may then be pushed back or actuated back to a contracted position, and shuttles can continue delivering items to the flexible containers. While in the extended position, delivery of items to the flexible containers coupled to the set of extendable arms may be temporarily suspended. For example, one or more sensors may be used to detect that the extendable arms are not in the contracted position, and delivery may be suspended until the arms are returned to the contracted position.

In some embodiments, instead of extendable arms 470, 480, the flexible containers 490 may be placed in a drawer that may support lower surfaces or portions of the flexible containers 490, and the drawers may be pulled out and pushed in, or otherwise actuated, to replace full flexible containers. In some embodiments, the extendable arms 470, 480 may be slideable arms that can extend and contract.

Any number of flexible containers may be coupled to one or more extendable arms. For example, an increase in the number of flexible containers (and corresponding chutes in the flexible container chute assemblies) may result in increased granularity of sortation, as more flexible containers may be used to route items or packages to more specific destinations. The flexible containers 490 may provide increased capacity relative to boxes of the same dimensions as a result of flexible surfaces. In addition, capacity of flexible containers can be increased by increasing a height of the flexible containers, without expanding a floor footprint of the item sorting system 400. Increased capacity may reduce container replenishment frequency. Flexible containers 490 may include sealing features, such as one or more zippers.

Figure 5:
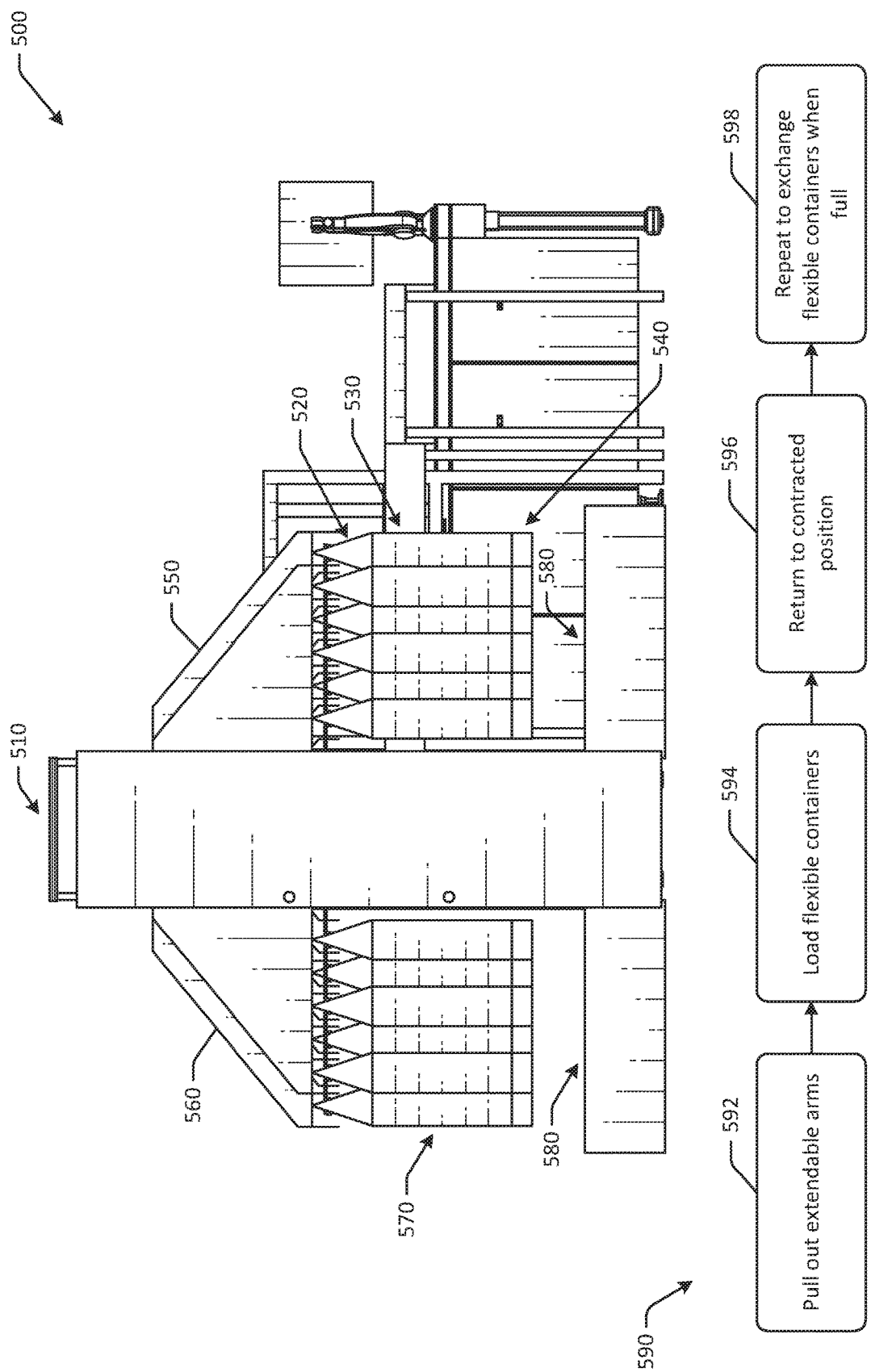
FIG. 5 is a schematic illustration of a side view of an item sorting system and an example process flow in accordance with one or more embodiments of the disclosure.

FIG. 5 is a schematic illustration of a side view of an item sorting system 500 and an example process flow in accordance with one or more embodiments of the disclosure. Other embodiments may include additional or fewer components. The illustration of FIG. 5 may not be to scale, and may not be illustrated to scale with respect to other figures. The item sorting system illustrated in FIG. 5 may be the same item sorting system discussed with respect to FIGS. 1-4.

In FIG. 5, the item sorting system 500 may be the same item sorting system 400 as that illustrated in FIG. 4. The item sorting system 500 may be configured to sort items, such as packages, into one or more flexible containers. In some embodiments, the item sorting system 500 may be configured to singulate items from a tote that includes one or more, such as a plurality, of items into one or more flexible containers. The item sorting system 500 may include one or more induction portions at which items may be inducted into the item sorting system 500.

The item sorting system 500 may include one or more shuttles 510 that are configured to transport items, such as products or packages, from the induction portion of the item sorting system 500 to a designated flexible container. The shuttle 510 may be disposed within the item sorting system 500, and may move vertically and/or horizontally within the item sorting system 500. In some embodiments, the shuttle 510 may move along an outside of the item sorting system 500. The shuttle 510 may move within a support frame that forms a path through which the shuttle 510 is configured to move. The paths may be internal paths through the item sorting system 500.

The item sorting system 500 may include one or more chute assemblies. For example, the item sorting system 500 may include a first chute assembly 550 coupled to the item sorting system 500, and a second chute assembly 560 coupled to the item sorting system 500. The first chute assembly 550 and the second chute assembly 560 may be disposed on different sides of the item sorting system 500. The first chute assembly 550 may include a number of ramps. For example, the first chute assembly 550 may include a first ramp angled in a downward direction relative to the item sorting machine 550, a second ramp angled in the downward direction at the same angle or a different angle, a third ramp angled in the downward direction at the same angle or a different angle, and so forth. The first ramp may be disposed at a bottom of the first chute assembly 550 and may direct items into a first flexible container, the second ramp may be disposed above the first ramp and may direct items into a second flexible container, and the third ramp may be disposed above the second ramp and may direct items into a third flexible container. The ramps may have the same widths or different widths. The second chute assembly 560 may have the same configuration (e.g., dimensions, number of ramps, etc.) as the first chute assembly 550, or a different configuration. A vertical distance between ramps may be adjustable and may be used to determine the size of items that can be deposited down the respective ramp.

A first set of flexible containers 530 may be disposed under the first chute assembly 550, and a second set of flexible containers 570 may be disposed under the second chute assembly 560. The first set of containers 530 may be positioned such that items deposited down the respective ramps of the first chute assembly 550 are guided into the particular flexible container disposed at the end of the ramp. Similarly, the second set of containers 570 may be positioned such that items deposited down the respective ramps of the second chute assembly 560 are guided into the particular flexible container disposed at the end of the ramp.

The flexible containers 530, 570 may include upper portions 520 that may be used to couple the flexible containers to extendable arms of the item sorting system 500. The upper portion 520 may be sealable and may include hooks, holes, or other securing means to secure the flexible containers to the respective arms. The flexible containers 530, 570 may have lower portions 540. In other embodiments, a drawer or a floor may be used to support the flexible containers under the respective chute assemblies instead of, or in addition to, extendable arms that support the upper portions 520.

One or more conveyor belts may be disposed under some or all of the flexible containers. For example, conveyor belts 580 may be disposed under the respective flexible containers 530, 570, such that full containers can be dropped onto the conveyor belt 580 and transported to another location, such as a loading dock.

An example process flow 590 is depicted in FIG. 5. The process flow 590 may be executed for loading and unloading of flexible containers, and/or as the flexible containers are filled during operation of the item sorting system 500. At a first block 592, the extendable arms supporting the flexible containers may be pulled outwards, or away from the item sorting system 500. In some embodiments, the extendable arms may be automatically extended using mechanical components. At a second block 594, flexible containers may be loaded onto the extended arms. For example, the flexible containers may include hooks, holes, magnets, or other hardware that can be used to secure the flexible containers to the extended arms. The extendable arms may include pre-marked portions of intervals at which the flexible containers can be coupled to the arms. At a third block 596, the arms may be returned to the contracted position. For example, the arms may be pushed back toward the item sorting system 500, or may be automatically contracted. At a fourth block 598, the process may be repeated to exchange flexible containers when full. For example, the arms may be extended, the full containers may be unloaded or removed from the arms, and may be dropped or placed onto the conveyors 580 or into a cart for transport.

Accordingly, the item sorting system 500 may include one or more extendable arms. For example, a first extendable arm and a second extendable arm may be configured to slide to an extended position. Containers mounted or otherwise coupled to the extendable arms may move with the extendable arms. For example, a first flexible container, a second flexible container, and a third flexible container may be configured to slide with the first extendable arm and the second extendable arm. The first extendable arm may include one or more, such as a first pair, of securing components. The second extendable arm may include one or more, such as a second pair, of securing components. The first pair of securing components and the second pair of securing components may be configured to secure one or more openings or holes of a flexible container in an open position. The flexible containers may include one or more zipper openings, and may be individually removed from the first extendable arm and the second extendable arm. The conveyor belt(s) 580 may be disposed under the flexible containers, and may be configured to transport flexible containers from the item sorting system 500.

Figure 6:
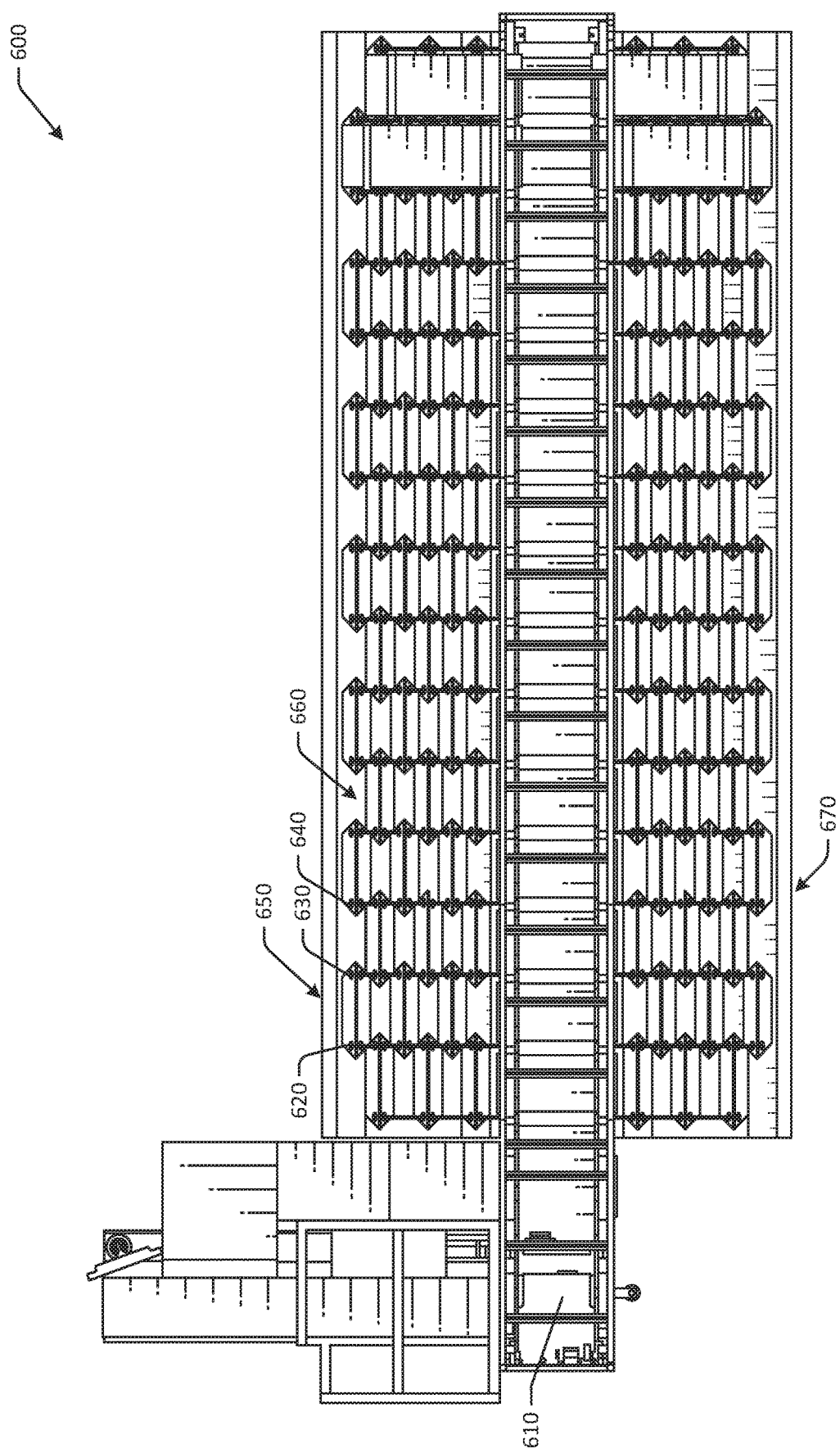
FIG. 6 is a schematic illustration of a top view of an item sorting system in accordance with one or more embodiments of the disclosure.

FIG. 6 is a schematic illustration of a top view of an item sorting system 600 in accordance with one or more embodiments of the disclosure. Other embodiments may include additional or fewer components. The illustration of FIG. 6 may not be to scale, and may not be illustrated to scale with respect to other figures. The item sorting system illustrated in FIG. 6 may be the same item sorting system discussed with respect to FIGS. 1-5.

In FIG. 6, the item sorting system 600 may be the same item sorting system 500 as that illustrated in FIG. 5. The item sorting system 600 may be configured to sort items, such as packages, into one or more flexible containers. In some embodiments, the item sorting system 600 may be configured to singulate items from a tote that includes one or more, such as a plurality, of items into one or more flexible containers. The item sorting system 600 may include one or more induction portions at which items may be inducted into the item sorting system 600.

The item sorting system 600 may include one or more shuttles 610 configured to transport items to particular chutes. The shuttle 610 may be configured to move vertically and/or horizontally about the item sorting system 600.

In some embodiments, the flexible containers used at the item sorting system 600 may be coupled to two extendable arms (e.g., one on each side of the container, etc.). In such instances, the flexible containers may be disposed in a side-by-side arrangement. However, in other embodiments, such as that illustrated in the top view of FIG. 6, the flexible containers may be arranged in a staggered or offset formation, such that one extendable arm is shared between adjacent flexible containers. For example, a first row of flexible containers 650 may be coupled to a first extendable arm 620 and a second extendable arm 630. However, adjacent flexible containers may be coupled to the first extendable arm 620 and the second extendable arm 630. Accordingly, extendable arms may be shared between flexible container rows. A third extendable arm 640 may secure an opposite side of the adjacent flexible containers, and therefore, three extendable arms may support two rows of flexible containers, instead of four extendable arms that may be used in other configurations. Accordingly, rows of flexible containers may be offset 660 on either side 670 of the item sorting system 600.

Figure 7:
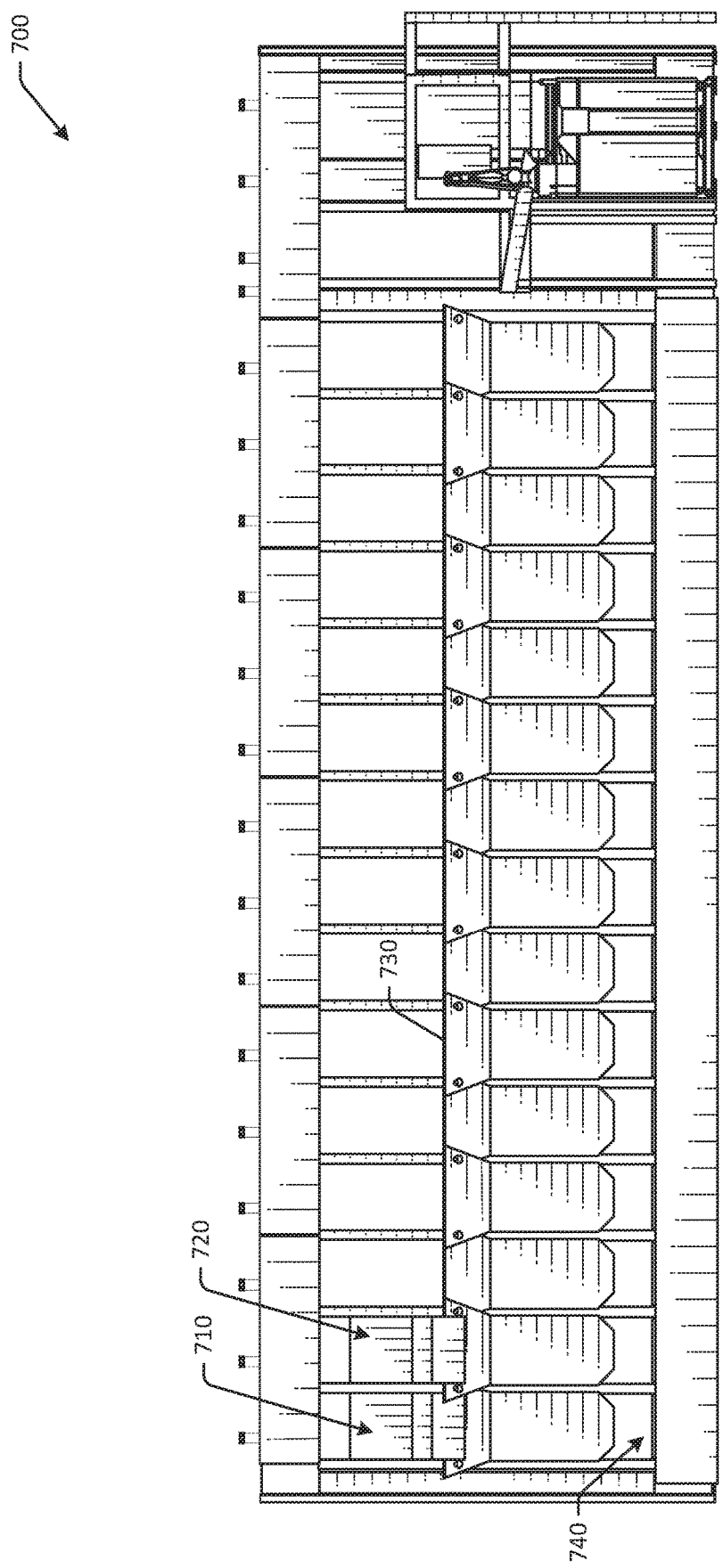
FIG. 7 is a schematic illustration of a front view of an item sorting system in accordance with one or more embodiments of the disclosure.

FIG. 7 is a schematic illustration of a front view of an item sorting system 700 in accordance with one or more embodiments of the disclosure. Other embodiments may include additional or fewer components. The illustration of FIG. 7 may not be to scale, and may not be illustrated to scale with respect to other figures. The item sorting system illustrated in FIG. 7 may be the same item sorting system discussed with respect to FIGS. 1-6.

In FIG. 7, the item sorting system 700 may be the same item sorting system 600 as that illustrated in FIG. 6. The item sorting system 700 may be configured to sort items, such as packages, into one or more flexible containers. In some embodiments, the item sorting system 700 may be configured to singulate items from a tote that includes one or more, such as a plurality, of items into one or more flexible containers. The item sorting system 700 may include one or more induction portions at which items may be inducted into the item sorting system 700.

The item sorting system 700 may include one or more flexible container chute assemblies. The respective flexible container chute assemblies may have a ramp for each of the flexible containers disposed under the chute assembly. For example, the item sorting system 700 may include a first flexible container chute assembly 710, and a second flexible container chute assembly 720. Any number of flexible container chute assemblies may be included. One or more flexible containers 730 may be disposed under the flexible container chute assemblies and may collect items disposed down ramps of the respective chute assemblies.

The item sorting system 700 may be a modular item sorting machine and may include a pair of extendable arms, a plurality of flexible containers removably coupled to the pair of extendable arms, and a chute assembly 710. The chute assembly 710 may include a plurality of ramps that can be used to deposit items into one or more of the plurality of flexible containers. The item sorting system 700 may include a shuttle configured to sort items inducted into the modular item sorting machine into one or more of the plurality of flexible containers. The plurality of ramps of the chute assembly may be vertically aligned or stacked.

Figure 8:
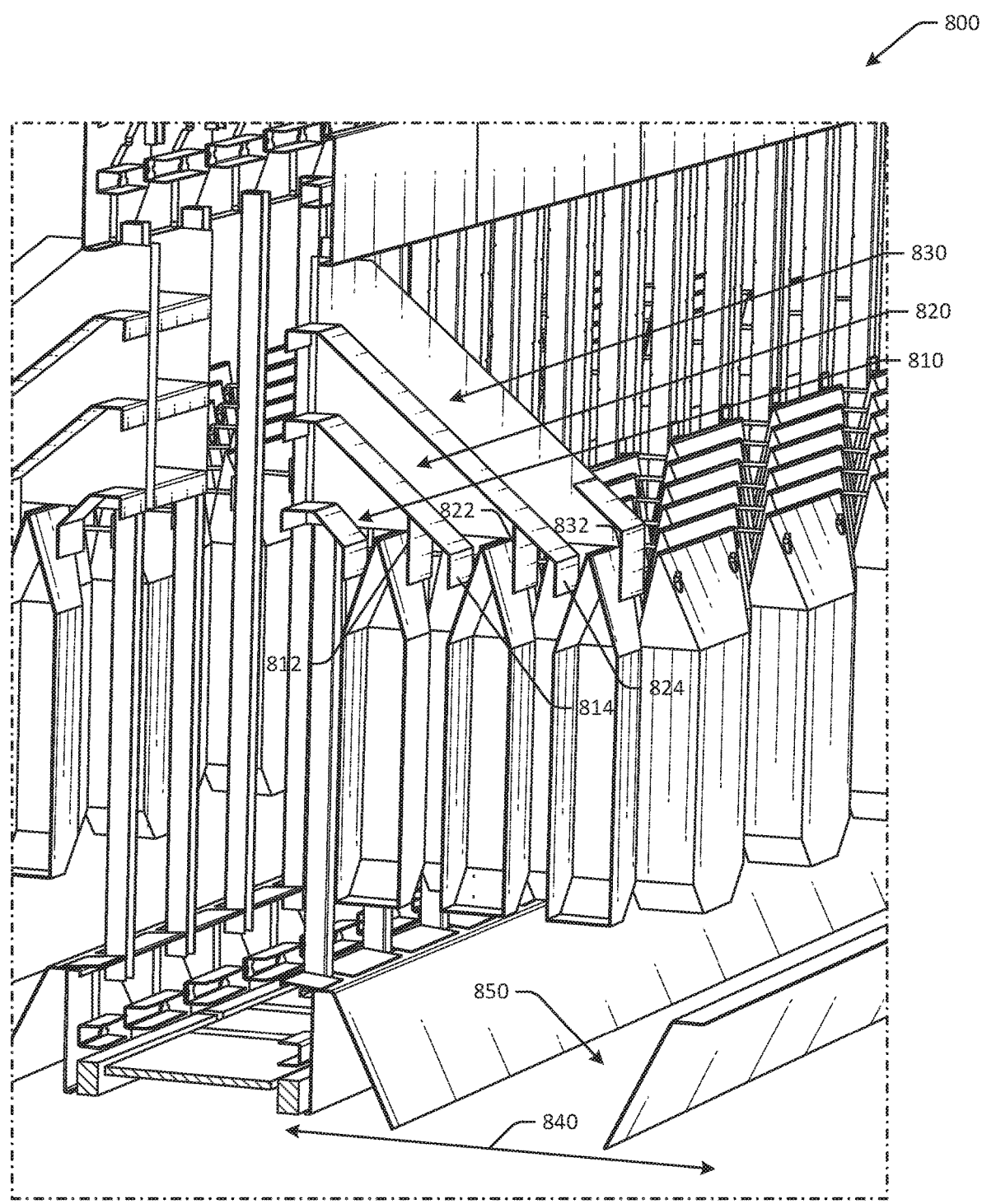
FIG. 8 is a schematic illustration of a perspective view of a flexible container chute for an item sorting system in accordance with one or more embodiments of the disclosure.

FIG. 8 is a schematic illustration of a perspective view of a flexible container chute assembly 800 for an item sorting system in accordance with one or more embodiments of the disclosure. Other embodiments may include additional or fewer components. The illustration of FIG. 8 may not be to scale, and may not be illustrated to scale with respect to other figures. The flexible container chute assembly 800 illustrated in FIG. 8 may be used with any of the item sorting systems discussed with respect to FIGS. 1-7.

In FIG. 8, the flexible container chute assembly 800 may be coupled to an item sorting system. The flexible container chute assembly 800 may include a first ramp 810 that guides items into a first flexible container, a second ramp 820 that guides items into a second flexible container, and a third ramp 830 that guides items into a third flexible container. The first ramp 810 may be a lower ramp, the second ramp 820 may be disposed above the first ramp 810, and the third ramp 830 may be disposed above the second ramp 820. The ramps may be angled at the same or different angles.

One or more separators may be disposed vertically between ends of adjacent ramps. For example, a first separator 814 may be coupled to an end of the second ramp 820. The first separator 814 may be angled with respect to the second ramp 820. For example, the first separator 814 may have a substantially vertical orientation. In some embodiments, a second separator 812 may be coupled to a lower surface of the second ramp 820 and may be parallel, or substantially parallel to the first separator 814. The second separator 812 may have a greater length than the first separator 812.

The first separator 814 and the second separator 812 may be spaced apart or otherwise separated to create separation between openings of the first flexible container and the second flexible container. Similarly, a third separator 822 may optionally be coupled to a lower surface of the third ramp 830, and a fourth separator 824 may be coupled to an end of the third ramp 830. A fifth separator 832 may be disposed at a top portion of the chute assembly and may be used to ensure items do not fly out of the topmost chute. The first ramp 810 may optionally include a separator at an end of the first ramp 810, and the first ramp 810 may be angled with respect to the separator. Any number of vertical separator components may be included.

Full containers may be dropped onto a conveyor belt 850 for transport from the item sorting machine. The chute assembly 800 may have a depth 840 that can be used to determine a number of flexible containers that can be used with the chute assembly 800 and the space between respective containers.

The item sorting system may include a first extendable arm coupled to the item sorting system, the first extendable arm disposed adjacent to a first side of the first chute assembly 800, and a second extendable arm coupled to the item sorting system, the second extendable arm disposed adjacent to a second side of the first chute assembly 800.

Flexible containers may include a first flexible container removably coupled to the first extendable arm and the second extendable arm, where the first flexible container is configured to receive items via the first ramp 810 when the first extendable arm and the second extendable arm are in a contracted position. The flexible containers may include a second flexible container removably coupled to the first extendable arm and the second extendable arm, where the second flexible container is configured to receive items via the second ramp 820 when the first extendable arm and the second extendable arm are in the contracted position. The flexible containers may include a third flexible container removably coupled to the first extendable arm and the second extendable arm, where the third flexible container is configured to receive items via the third ramp 830 when the first extendable arm and the second extendable arm are in the contracted position. The first vertical separator component 814 may separate the first flexible container from the second flexible container, and the third vertical separator component 824 may separate the second flexible container from the third flexible container.

The first extendable arm and the second extendable arm may be configured to support an upper portion of the flexible containers in an open position. In some embodiments, the arms may be disposed near a lower portion of the flexible containers, and a floor may be disposed between the first extendable arm and the second extendable arm, where the floor supports a lower portion of the first flexible container.

Flexible containers may be disposed at more than one side of the item sorting machine. For example, the first extendable arm and the second extendable arm may be disposed at a first side of the item sorting system. The item sorting system may include a third extendable arm and a fourth extendable arm, where the third extendable arm and the fourth extendable arm are disposed at a second side of the item sorting system.

Although FIG. 8 illustrates one chute assembly, the item sorting system may include multiple chute assemblies, such as a second chute assembly disposed adjacent to the first chute assembly.

Figure 9:
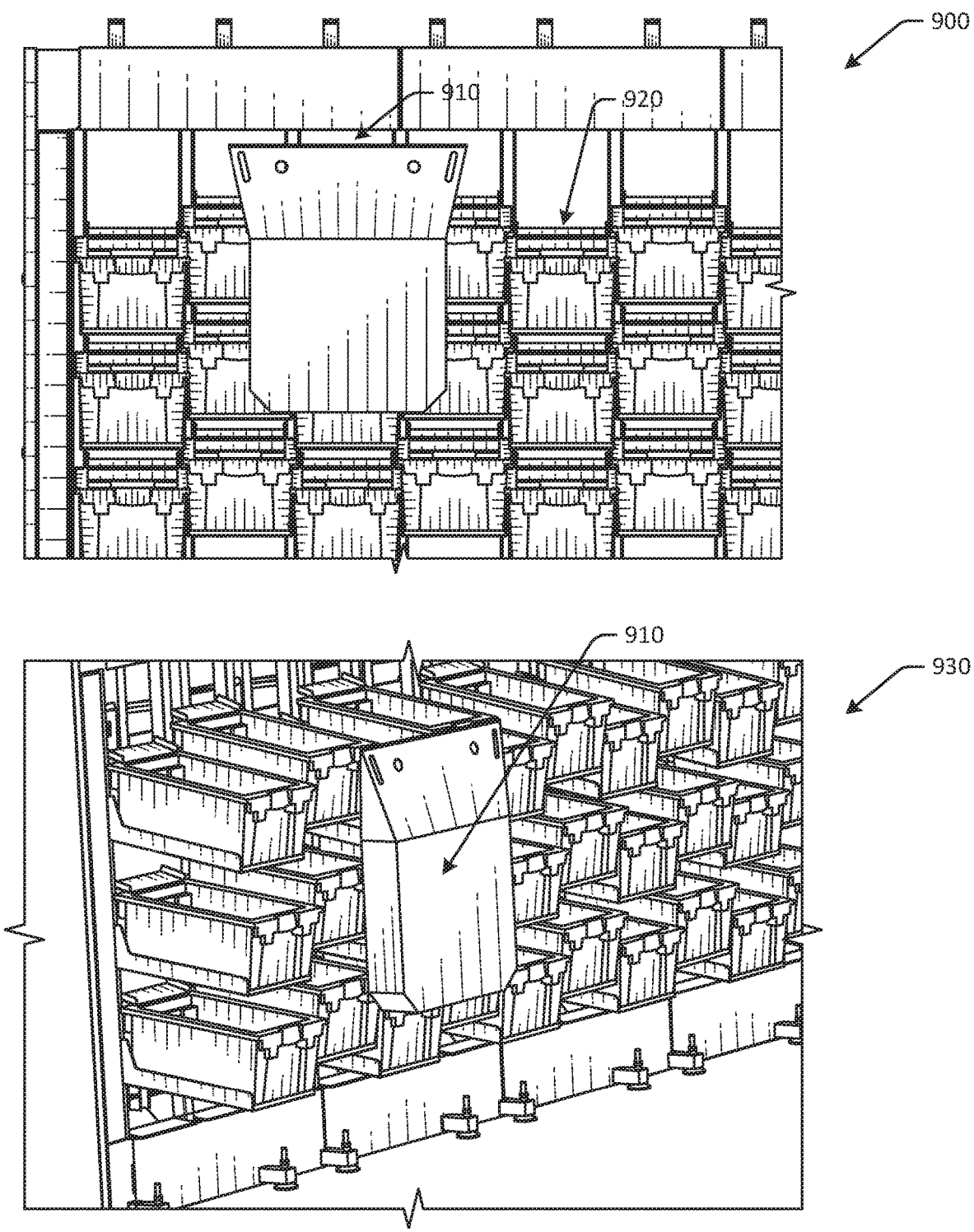
FIG. 9 is a schematic illustration of various views of a flexible container for an item sorting system in accordance with one or more embodiments of the disclosure.

FIG. 9 is a schematic illustration of various views of a flexible container 910 for an item sorting system in accordance with one or more embodiments of the disclosure. Other embodiments may include additional or fewer components. The illustrations of FIG. 9 may not be to scale, and may not be illustrated to scale with respect to other figures. The flexible container 910 illustrated in FIG. 9 may be the flexible containers discussed with respect to FIGS. 1-8.

In a first view 900, the flexible container 910 is illustrated in contrast with an array of bins 920. As illustrated, the flexible container 910 may increase the width of items that can be placed in the flexible container 910 relative to those that can be placed in the bins 920. In a second view 930, the flexible container 910 is illustrated relative to the depth of the bins to depict how a number of flexible containers 910 can be arranged in a row instead of the stack of bins 920. Accordingly, flexible containers 910 may result in improved sort density and throughput of items, such as products and packages.

Figure 10:
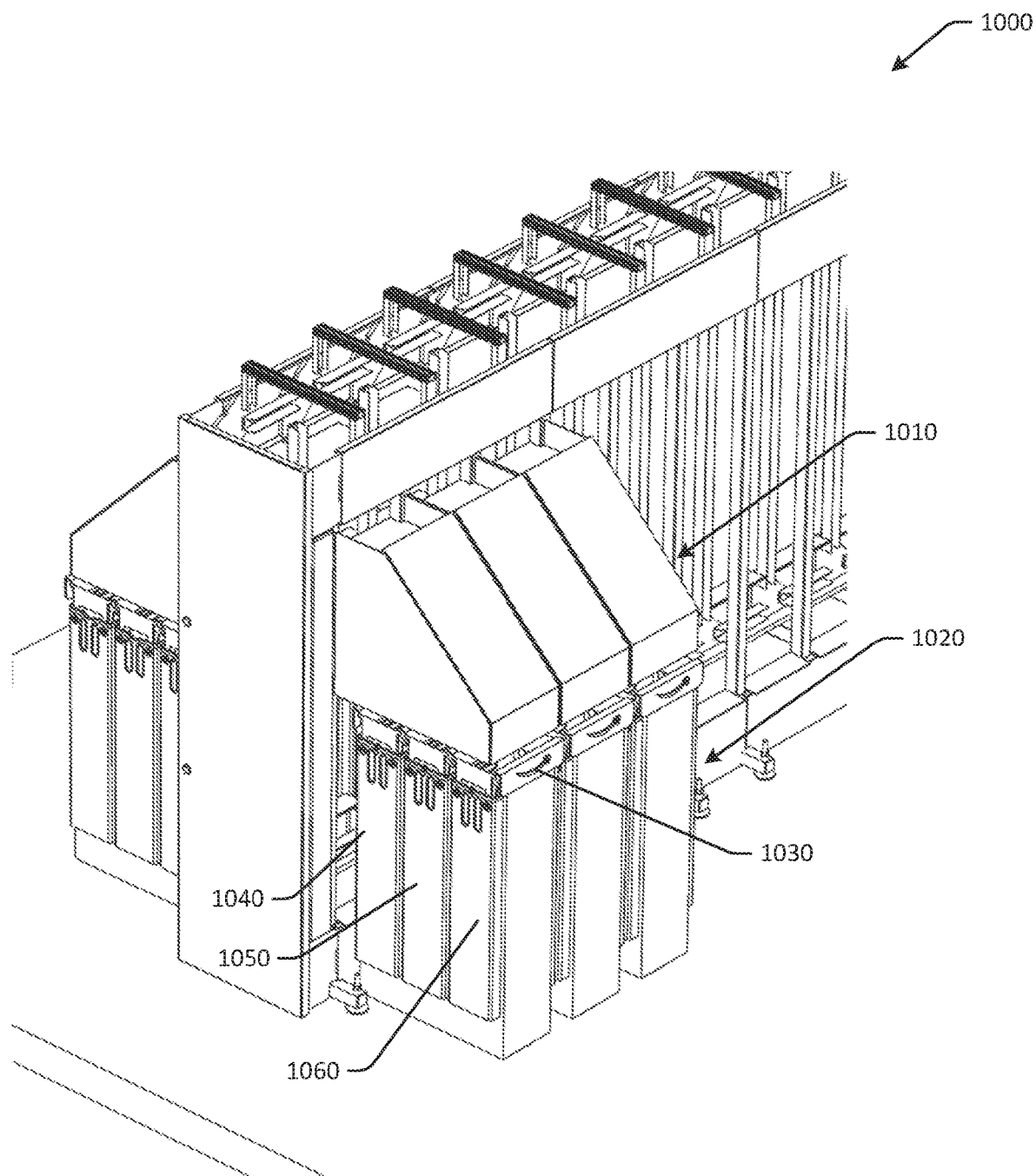
FIG. 10 is a schematic illustration of a perspective view of an item sorting system with a moveable cart in accordance with one or more embodiments of the disclosure.

FIG. 10 is a schematic illustration of a perspective view of an item sorting system 1000 with a moveable cart in accordance with one or more embodiments of the disclosure. Other embodiments may include additional or fewer components. The illustration of FIG. 7 may not be to scale, and may not be illustrated to scale with respect to other figures. The item sorting system illustrated in FIG. 7 may be the same item sorting system discussed with respect to FIGS. 1-8.

In FIG. 10, the item sorting system 1000 may include the same components as discussed with respect to the item sorting system of FIG. 7. However, instead of including extendable arms or drawers that support flexible containers, the item sorting system 1000 may be used with one or more moveable carts 1020. The moveable carts 1020 may be positioned under one or more flexible container chute assemblies 1010, as illustrated in FIG. 10. The moveable carts 1020 may include individual flexible containers that may be positioned in one or more slots in the respective moveable carts 1020. For example, a first moveable cart may include a first flexible container slot 1040, a second flexible container slot 1050, and a third flexible container slot 1060. An operator may use a handle 1030 to pull and/or push the moveable cart into and out of position for filling and/or replacing flexible containers. Accordingly, in some embodiments, the item sorting system 1000 may be used with one or more carts to support and/or position flexible containers in certain locations underneath certain ramps or chutes.

Figure 11:
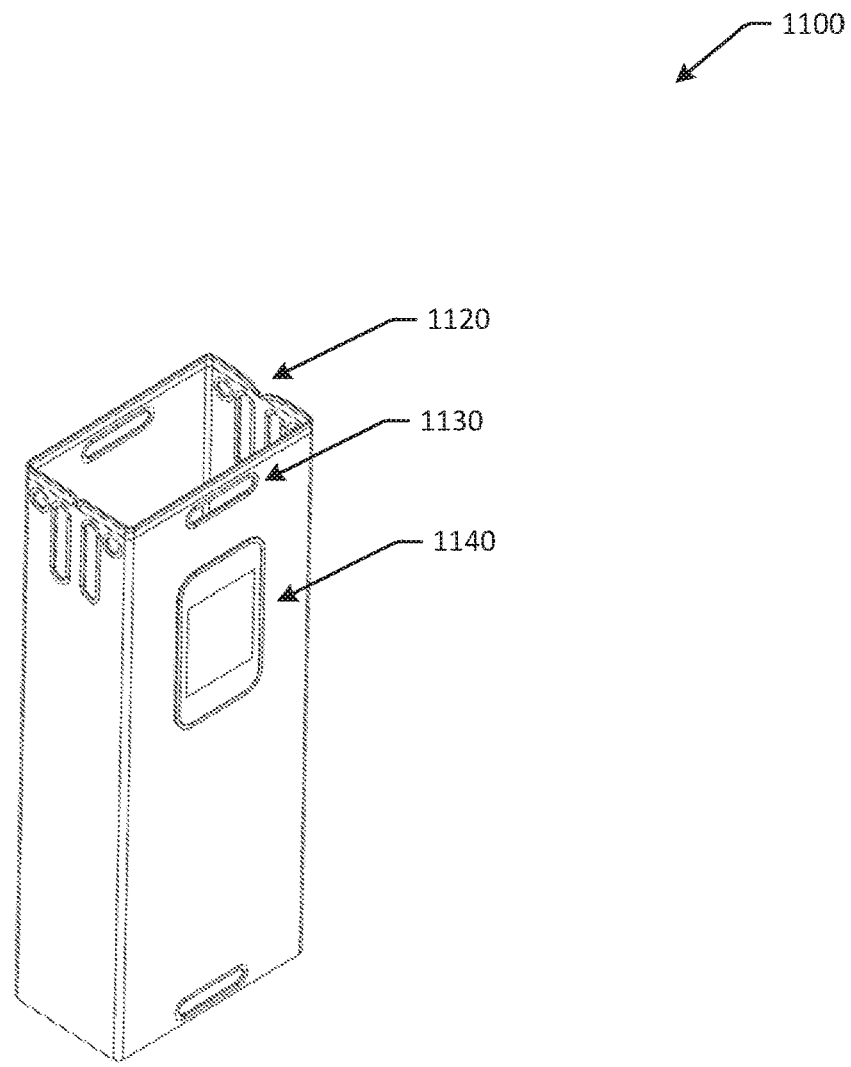
FIG. 11 is a schematic illustration of a perspective view of a flexible container for use with an item sorting system in accordance with one or more embodiments of the disclosure.

FIG. 11 is a schematic illustration of a perspective view of a flexible container 1100 for use with an item sorting system in accordance with one or more embodiments of the disclosure. For example, the flexible container 1100 may be used with the cart(s) of the item sorting system 1000 of FIG. 10. The flexible container 1100 may include securing locations 1120 that may be used to secure the flexible container 1100 to the flexible container slot in the cart, as well as handles 1130 that may be used to handle and/or move the flexible container 1100. The flexible container 1100 may include a label portion 1140 that may be used to paste a label indicative of a destination of the flexible container 1100. Accordingly, the flexible container 1100 may be different than that of FIG. 9, and may be used with any one of the item sorting systems described herein.

Figure 12:
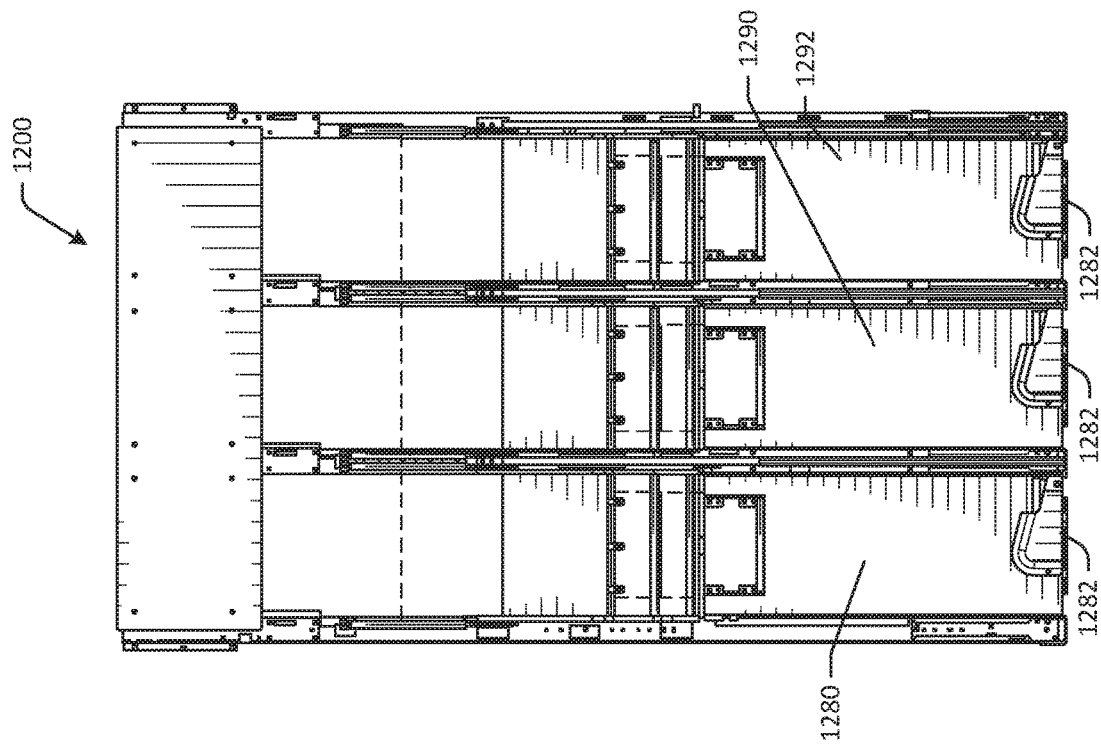
FIG. 12 is a schematic illustration of various views of a container chute for an item sorting system in accordance with one or more embodiments of the disclosure.
Figure 12:
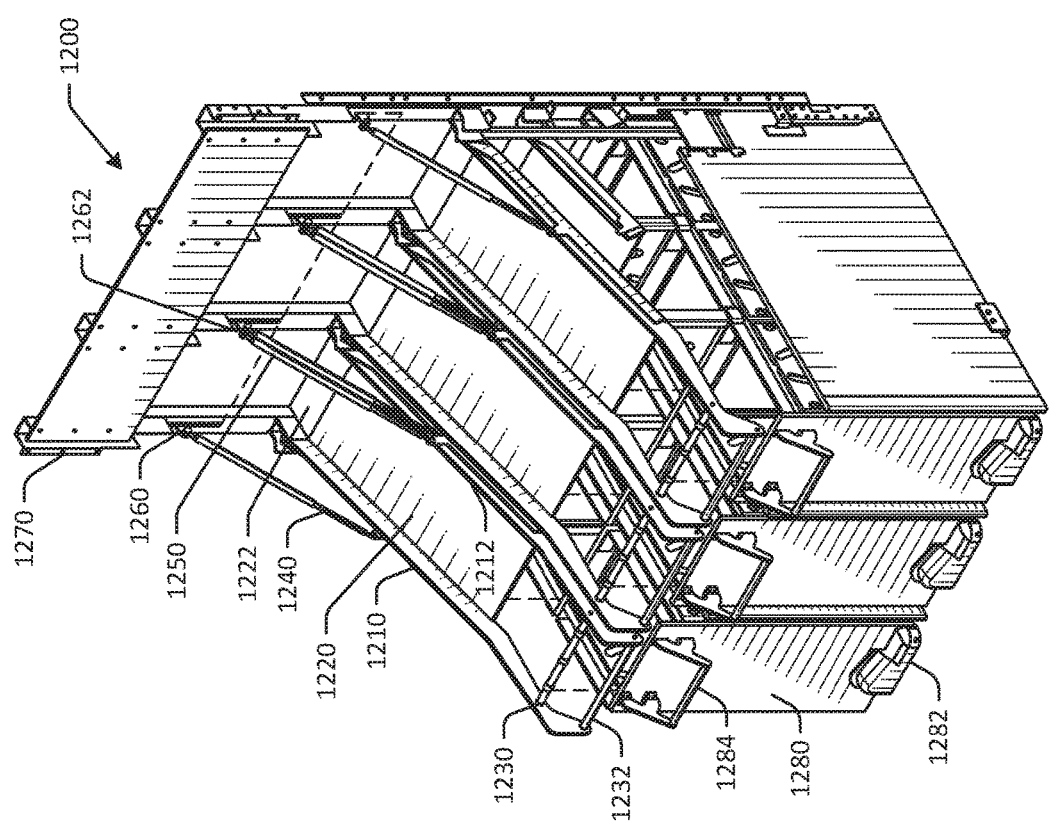

FIG. 12 is a schematic illustration of various views of a container chute for an item sorting system in accordance with one or more embodiments of the disclosure. Other embodiments may include additional or fewer components. The illustration of FIG. 12 may not be to scale, and may not be illustrated to scale with respect to other figures. The item sorting system illustrated in FIG. 12 may be the same item sorting system discussed with respect to FIGS. 1-11.

In FIG. 12, an item sorting system 1200 is depicted in perspective view and in a front view. The item sorting system 1200 may be used with any sortation system, such as a twenty pound item sortation system. The item sorting system 1200 may be used with a moveable cart, such as a rollable cart, that can be used to receive sorted items, packages, or other objects. As discussed herein, the rollable cart may include one or more containers, such as flexible bags or containers, that may be removed from the moveable cart when full and replaced.

The item sorting system 1200 may include a frame 1270. The frame 1270 may form supports or side portions of the item sorting system 1200. One or more chute assemblies may be coupled to the frame 1270 of the item sorting system 1200. For example, the illustrated embodiment includes three chute assemblies in a side-by-side configuration. The respective chute assemblies may be arranged adjacent to each other. Some or all of the chute assemblies may be disposed over respective moveable carts.

The chute assemblies may be configured to be manually or automatically raised from a first position (illustrated in FIG. 12) to a second position in which the ramp(s) of the chute assembly are perpendicular, or substantially perpendicular, to a vertical portion of the frame 1270. For example, when it is time to change containers from the moveable cart, an operator may manually lift a chute assembly with the assistance of one or more pneumatic supports or struts, and the struts may hold the chute assembly in an elevated or lifted position until the operator pulls the chute assembly back down. While the chute assembly is in the lifted position, the operator may pull out the removable cart, remove full containers, replace with empty containers, and replace the moveable cart. Delivery of items may be paused when the chute assembly is not in the lowered position illustrated in FIG. 12. Jams may be cleared on chutes by lifting the chutes as well.

In FIG. 12, a first chute assembly is coupled to the frame 1270. The first chute assembly may be configured to pivot or move from a first position to a second position with respect to the frame 1270. The second position may be a lifted position, and may be substantially perpendicular to the frame. In some embodiments, the first chute assembly, or components of the first chute assembly, may be coupled to the frame 1270 using one or more hinges.

The first chute assembly may include a first planar ramp 1220. The first planar ramp 1220 may provide a flat surface for objects to move down into one of the containers on a moveable cart 1280 positioned underneath the first chute assembly. The first planar ramp 1220 may be formed of a material such as one or more composite materials, wood, sheet metal, stainless steel, plastic, and/or a different fire-retardant and/or non-magnetic material. The first planar ramp 1220 may be removably coupled to one or more supports. For example, one or more supports may form an exoskeleton in which the first planar ramp 1220 is positioned. The first chute assembly may include a first support 1210 on a first side of the first planar ramp 1220, and a second support 1212 on a second side of the first planar ramp 1220. The first planar ramp 1220 may be removably coupled to both the first support 1210 and the second support 1212. In some embodiments, a second planar ramp portion 1222 may be a horizontally positioned ramp component disposed adjacent to the frame 1270.

As illustrated in FIG. 12, the first support 1210 and the second support 1212 have a first length, and the first planar ramp 1220 has a second length that is less than the first length. As a result, objects pushed down the first planar ramp 1220 may fall into an opening and down into a container beneath the opening.

The first chute assembly may include one or more lift components, such as pneumatic lift supports. For example, the first chute assembly may include a first pneumatic lift component 1240 coupled to the first support 1210 and to the frame 1270. The first chute assembly may include an optional second pneumatic lift component 1250 coupled to the second support 1212 and to the frame 1270. The respective pneumatic lift components may be any suitable lift support component, such as gas-based or fluid-based supports. The first pneumatic lift component 1240 may be coupled to the frame 1270 at a first fixed point 1260, and the second pneumatic lift component 1250 may be coupled to the frame 1270 at a second fixed point 1262. In contrast, the supports for the first planar ramp may include, respectively for both the first support and the second support, multiple sections that may be coupled using one or more hinges, such that the first planar ramp portion 1220 may move with respect to the second planar ramp portion 1222.

The first chute assembly may be held in the second position when the first pneumatic lift component 1240 and the second pneumatic lift component 1250 are in a compressed configuration, and the first chute assembly may be in the first position or a default lowered position when the first pneumatic lift component 1240 and the second pneumatic lift component 1250 are in an extended configuration, such as that illustrated in FIG. 12.

The first chute assembly may include one or more handles 1232 that may be used to raise and/or lower the first chute assembly. In addition, the first chute assembly may include lateral bars 1230 disposed between the first support 1210 and the second support 1212 to which a vinyl flap may be coupled. The vinyl flap may be used to facilitate guiding of items into a container below the chute. For example, the first chute assembly may include a first vinyl flap adjacent to the first planar ramp 1220, and a second vinyl flap adjacent to a second planar ramp disposed under the first planar ramp 1220.

As illustrated in a front view of the item sorting system 1200, one or more moveable carts, including the first moveable cart 1280, may be disposed under respective chute assemblies. For example, a second moveable cart 1290 may be disposed under a second chute assembly, and a third moveable cart 1292 may be disposed under a third chute assembly. Each of the moveable carts may include a foot brake 1282 that may be used to secure the cart in position under the respective chute assemblies. Each of the moveable carts may include one or more, such as a plurality of, containers arranged in container slots, and the foot brake 1282 may be disposed at a front end of the moveable cart.

Figure 13:
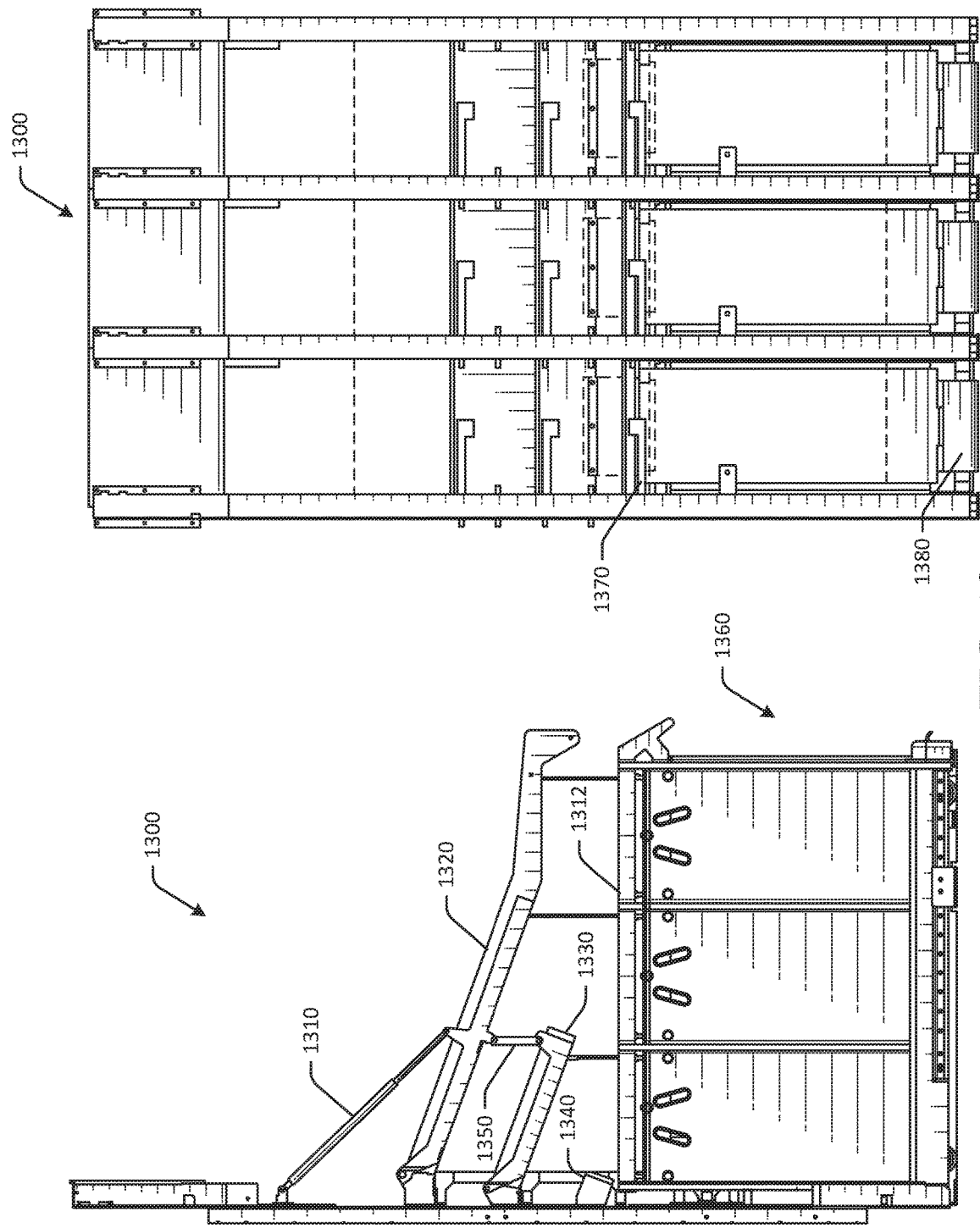
FIG. 13 is a schematic illustration of various views of a container chute for an item sorting system in accordance with one or more embodiments of the disclosure.

FIG. 13 is a schematic illustration of various views of a container chute for an item sorting system 1300 in accordance with one or more embodiments of the disclosure. Other embodiments may include additional or fewer components. The illustration of FIG. 13 may not be to scale, and may not be illustrated to scale with respect to other figures. The item sorting system illustrated in FIG. 13 may be the same item sorting system discussed with respect to FIGS. 1-12.

In FIG. 13, the item sorting system 1300 is presented in a left side view and a rear view. The item sorting system 1300 may be the same as the item sorting system 1200 of FIG. 12. As illustrated in FIG. 13, the item sorting system 1300 may include a chute assembly. The chute assembly may include a first ramp 1320, and a second ramp 1330 disposed adjacent to and/or under the first ramp 1320. In some embodiments, the chute assembly may include a third ramp 1340 disposed under the second ramp 1330. In other embodiments, the third ramp 1340 may be a separate component, or may be part of the item sorting system 1300.

The first ramp 1320 may be coupled to the second ramp 1330 using one or more linking components 1350. The linking components 1350 may be any suitable linkage structure. The linking components 1350 may cause the second ramp 1330 to move with the first ramp 1320 when the first ramp 1320 is lifted from the lower position to a raised position. Accordingly, the second ramp 1330 support structure may include one or more hinges to facilitate motion of the second ramp 1330.

The chute assembly may include one or more pneumatic lift supports 1310 to facilitate lifting of the chute assembly and/or to hold the chute assembly in the lifted position. In some embodiments, the third ramp 1340 may be stationary or have a fixed position, such that the third ramp 1340 does not move when the first and second ramps are lifted.

Accordingly, as illustrated in FIG. 13, the chute assembly may include the second planar ramp disposed adjacent to the first planar ramp. A third support may be disposed on a first side of the second planar ramp, and a fourth support may be disposed on a second side of the second planar ramp. The second planar ramp may be coupled to both the third support and the fourth support. The first linking component 1350 may be coupled to the first support and the third support, and a second linking component coupled to the second support and the fourth support on an opposite side. The first pneumatic lift component 1310 and the second pneumatic lift component may be configured to support both the first planar ramp and the second planar ramp, and movement of the chute assembly from the first position to the second position may include movement of both the first planar ramp and the second planar ramp. The chute assembly may optionally include a third planar ramp disposed adjacent to the second planar ramp, with a fifth support on a first side of the third planar ramp and a sixth support on a second side of the third planar ramp.

A moveable cart 1360 may be disposed under the chute assembly. The moveable cart 1360 may include a bag support 1312 formed of individual brackets. Bags or other containers may be coupled to the bag support 1312 using, for example, one or more J-hooks. The depicted design of the bag support 1310 is for illustrative purposes only, and other embodiments may have a different design. The item sorting system 1300 may include one or more switches 1370 that may be automatically activated when the moveable cart 1360 is in position under the chute assembly to trigger delivery of items down the chute. A backstop 1380 configured to stop motion of the moveable cart 1360 may be disposed between the frame and the movable cart 1360. The switch 1370 may be configured to automatically trigger package delivery down the chute assembly when the moveable cart 1360 is positioned adjacent to the chute assembly.

Figure 14:
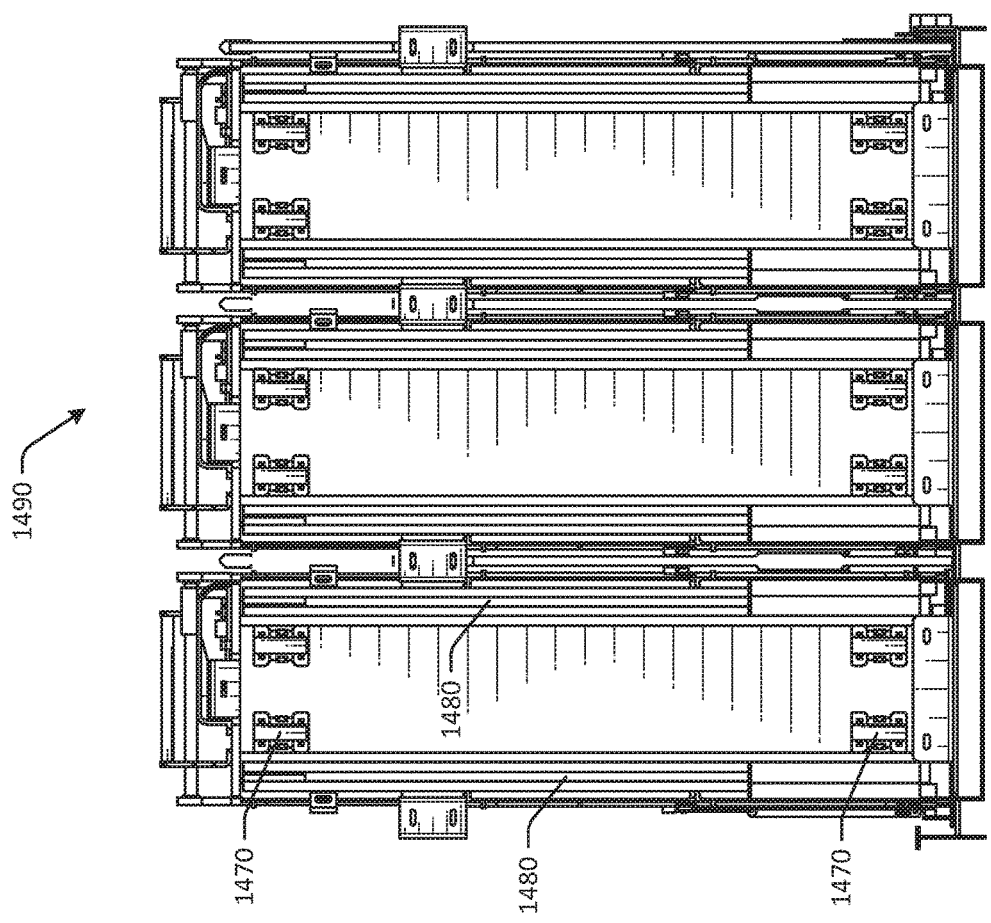
FIG. 14 is a schematic illustration of various views of a container chute for an item sorting system in accordance with one or more embodiments of the disclosure.
Figure 14:
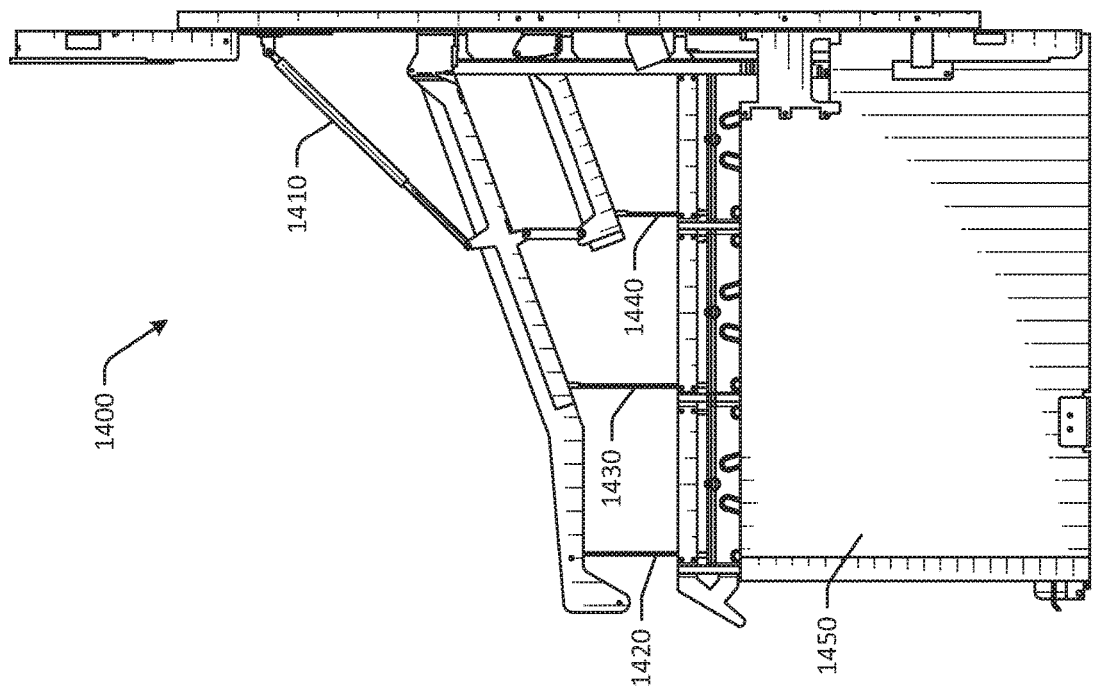

FIG. 14 is a schematic illustration of various views of a container chute for an item sorting system 1400 in accordance with one or more embodiments of the disclosure. Other embodiments may include additional or fewer components. The illustration of FIG. 14 may not be to scale, and may not be illustrated to scale with respect to other figures. The item sorting system illustrated in FIG. 14 may be the same item sorting system discussed with respect to FIGS. 1-13.

In FIG. 14, the item sorting system 1400 is presented in a right side view and a bottom view. The item sorting system 1400 may be the same as the item sorting system 1300 of FIG. 13. As illustrated in FIG. 14, the item sorting system 1400 may include a pneumatic lift support 1410, and one or more separator components, such as vinyl flaps, that prevent items from going into the incorrect container. For example, a first separator component 1420 may be disposed adjacent to the first ramp, a second separator component 1430 may also be disposed adjacent to the first ramp (e.g., underneath), and a third separator component 1440 may be disposed adjacent to the second ramp.

A moveable cart 1450 may be disposed adjacent to the chute assembly. The moveable cart 1450 may include one or more containers arranged in container slots. As illustrated in the bottom view in FIG. 14, the item sorting system 1400 may include one or more guiderails 1480 configured to facilitate positioning of the moveable cart 1460 underneath the chute assembly. The moveable cart 1450 may include wheels 1470 that allow the moveable cart 1450 to be pushed and/or pulled into and out of position underneath the chute assembly, and the item sorting system 1400 may include rails that allow for proper alignment of the moveable cart during positioning.

Figure 15:
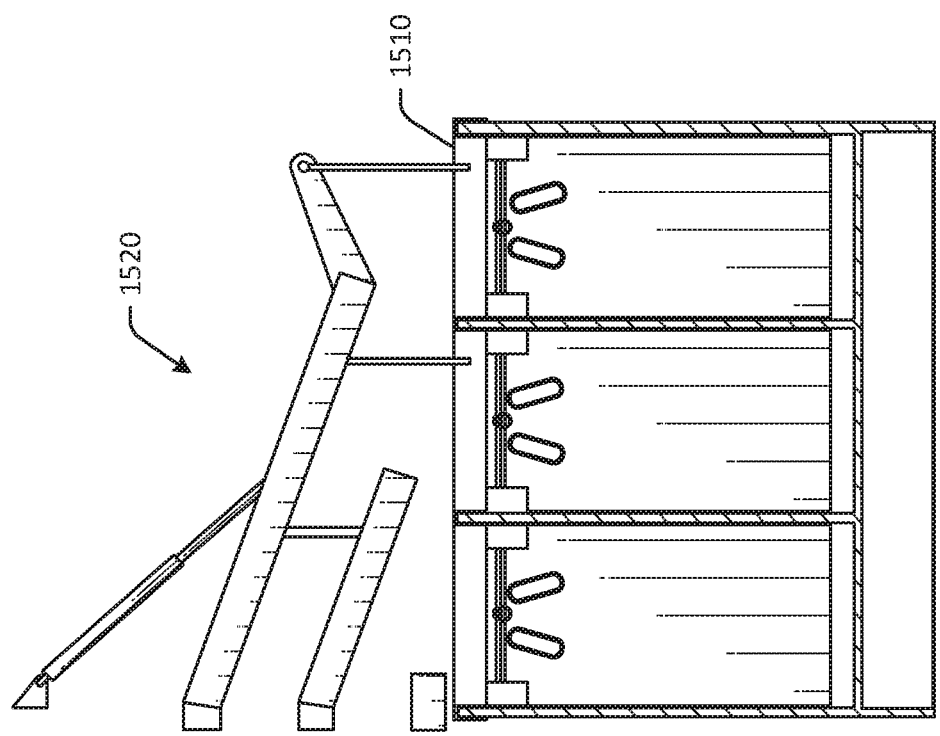
FIG. 15 is a schematic illustration of various views of a container chute and container cart with bags in accordance with one or more embodiments of the disclosure.
Figure 15:
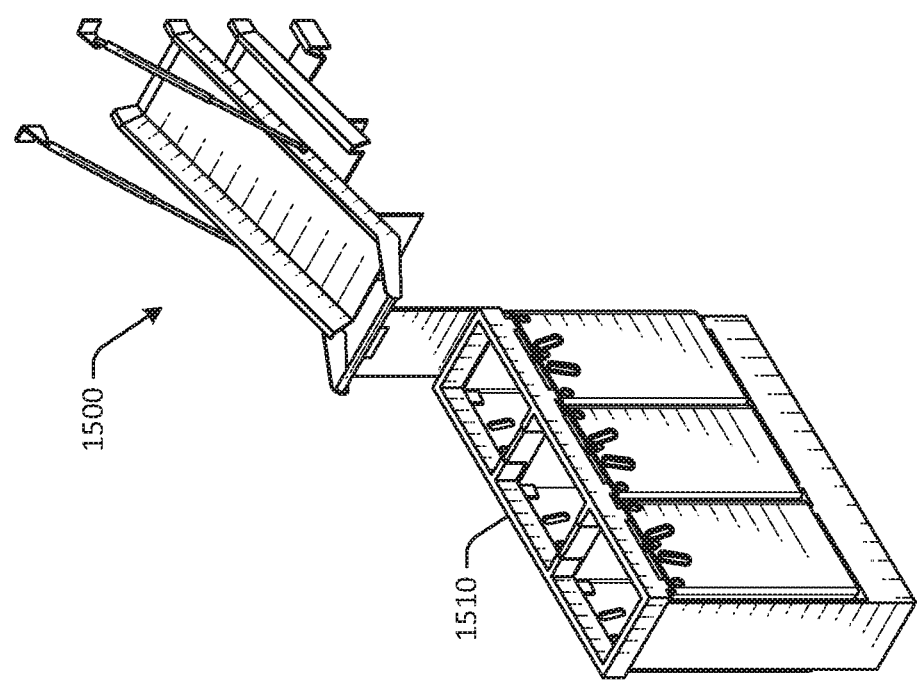

FIG. 15 is a schematic illustration of various views of a container chute 1500 and container cart with bags 1510 in accordance with one or more embodiments of the disclosure. Other embodiments may include additional or fewer components. The illustration of FIG. 15 may not be to scale, and may not be illustrated to scale with respect to other figures. The item sorting system illustrated in FIG. 15 may be the same item sorting system discussed with respect to FIGS. 1-14.

In FIG. 15, the container chute 1500 is illustrated in a perspective view and a side view 1520. In the perspective view, the container cart 1510 is moved away from the chute assembly, and in the side view 1520, the container cart 1510 is positioned under the chute assembly. In some embodiments, the chute assembly may be raised prior to removing and/or replacing the container cart 1510 into position. When the container cart 1510 is removed from under the chute assembly, full containers can be removed from the container cart 1510 and empty containers can be placed into the container slots on the container cart 1510.

Figure 16:
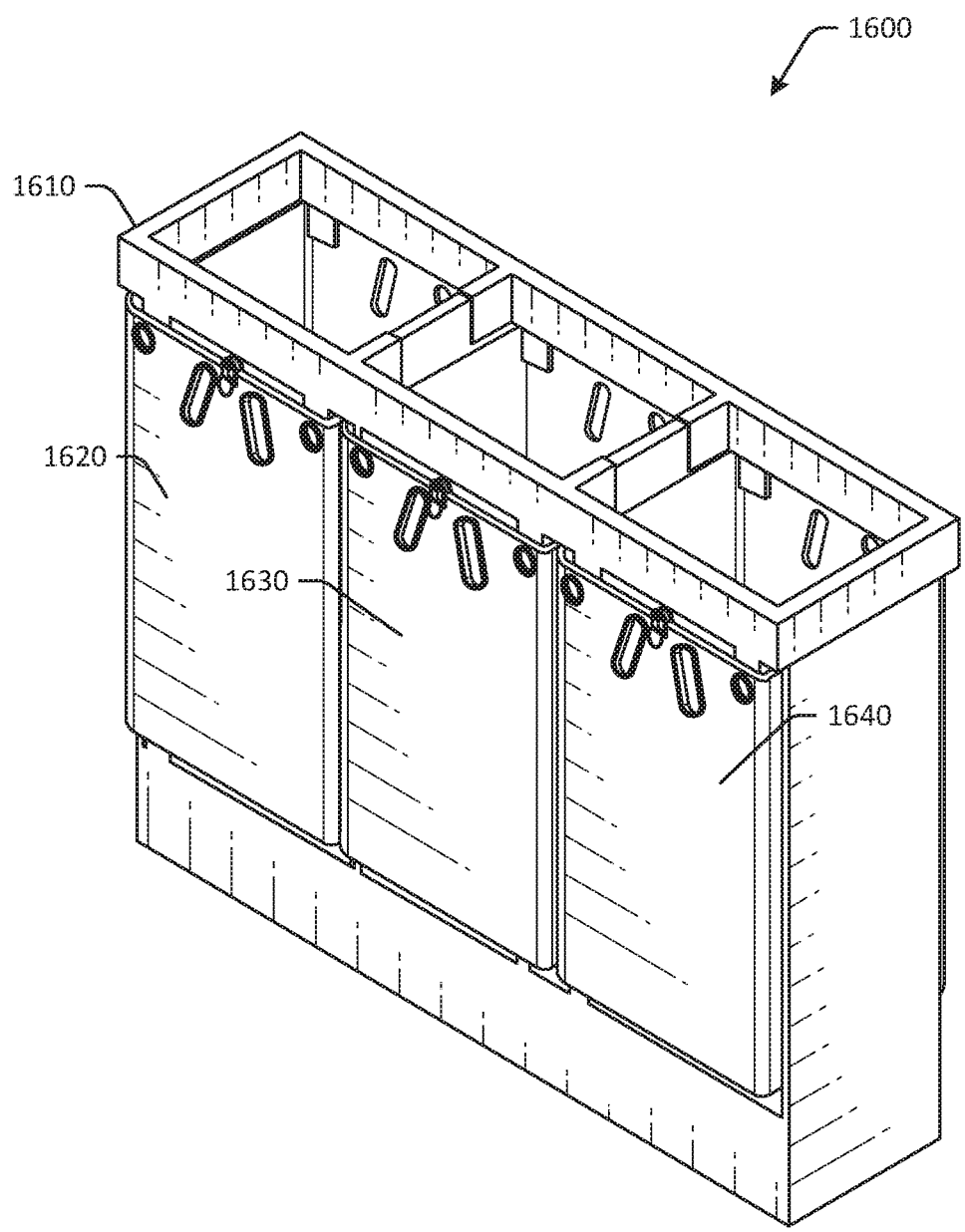
FIG. 16 is a schematic illustration of a container cart with bags in accordance with one or more embodiments of the disclosure.

FIG. 16 is a schematic illustration of a container cart with bags 1600 in accordance with one or more embodiments of the disclosure. Other embodiments may include additional or fewer components. The illustration of FIG. 16 may not be to scale, and may not be illustrated to scale with respect to other figures. The container cart illustrated in FIG. 16 may be the same container cart discussed with respect to FIGS. 1-15.

As illustrated in FIG. 16, the container cart 1600 may include a bag support 1610 that defines discrete container slots. For example, three container slots may be included in the container cart 1600. Containers may be coupled to, or otherwise placed in, the container slots using J-hooks (as illustrated in FIG. 16) or any other suitable mechanism. A first container 1620, which may be a flexible container or bag, may be in a first slot, a second container 1630 may be in a second slot, and a third container 1640 may be in a third slot. The depicted bag support 1610 is for illustrative purposes only, and other embodiments may be structured differently, as illustrated in FIGS. 12-14. For example, other embodiments may include bag supports formed on a number of brackets, such that replacement of a single bracket may not necessitate removal of the entire bag support.

Figure 17:
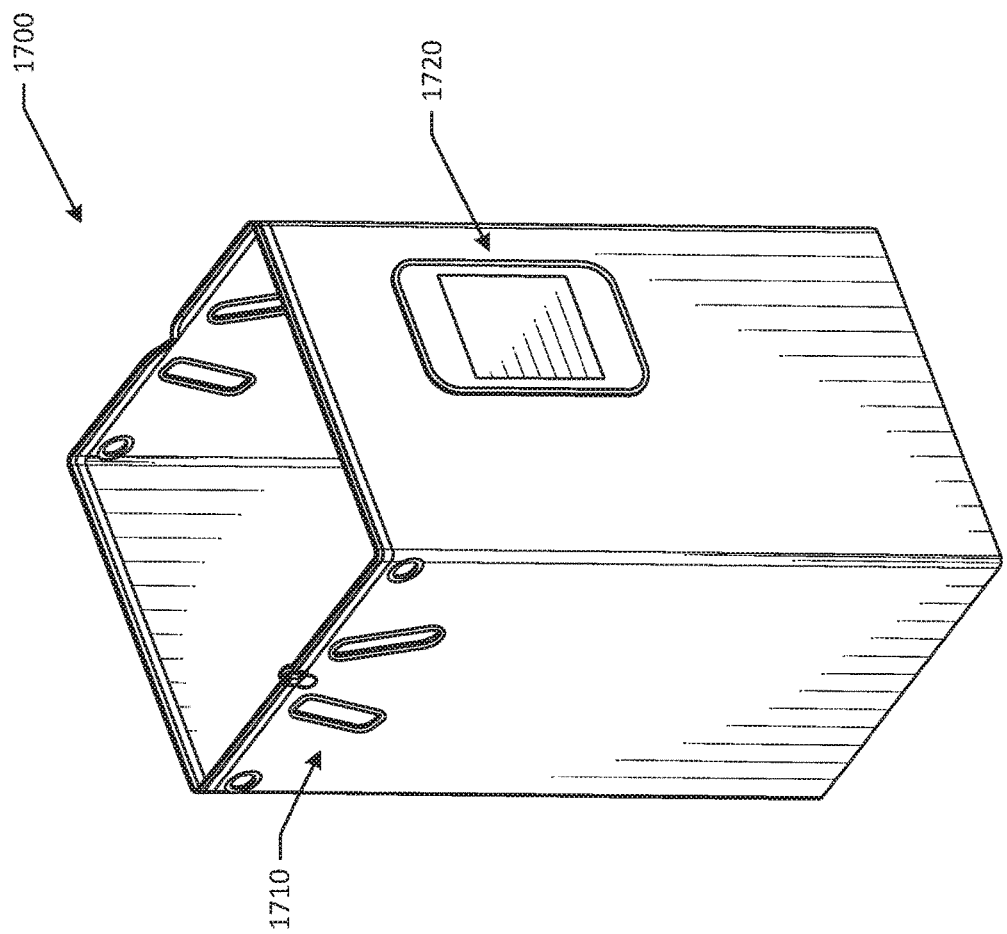
FIG. 17 is a schematic illustration of a container in accordance with one or more embodiments of the disclosure.

FIG. 17 is a schematic illustration of a container 1700 in accordance with one or more embodiments of the disclosure. Other embodiments may include additional or fewer components. The illustration of FIG. 17 may not be to scale, and may not be illustrated to scale with respect to other figures.

The container 1700 may be used with the container cart of FIG. 16 or the moveable carts of FIGS. 12-16. The container 1700 may include a tag area 1720 at which a label can be applied to indicate a destination of the container. The container 1700 may include handles 1710 that can be used to manually lift or otherwise move the container 1700. The container 1700 may be zipped or otherwise secured when full, and transported to its destination.

One or more operations of the methods, process flows, or use cases of FIGS. 1-17 may have been described above as being performed by a user device, or more specifically, by one or more program module(s), applications, or the like executing on a device. It should be appreciated, however, that any of the operations of the methods, process flows, or use cases of FIGS. 1-17 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-17 may be described in the context of the illustrative devices, it should be appreciated that such operations may be implemented in connection with numerous other device configurations.

The operations described and depicted in the illustrative methods, process flows, and use cases of FIGS. 1-17 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-17 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 18:
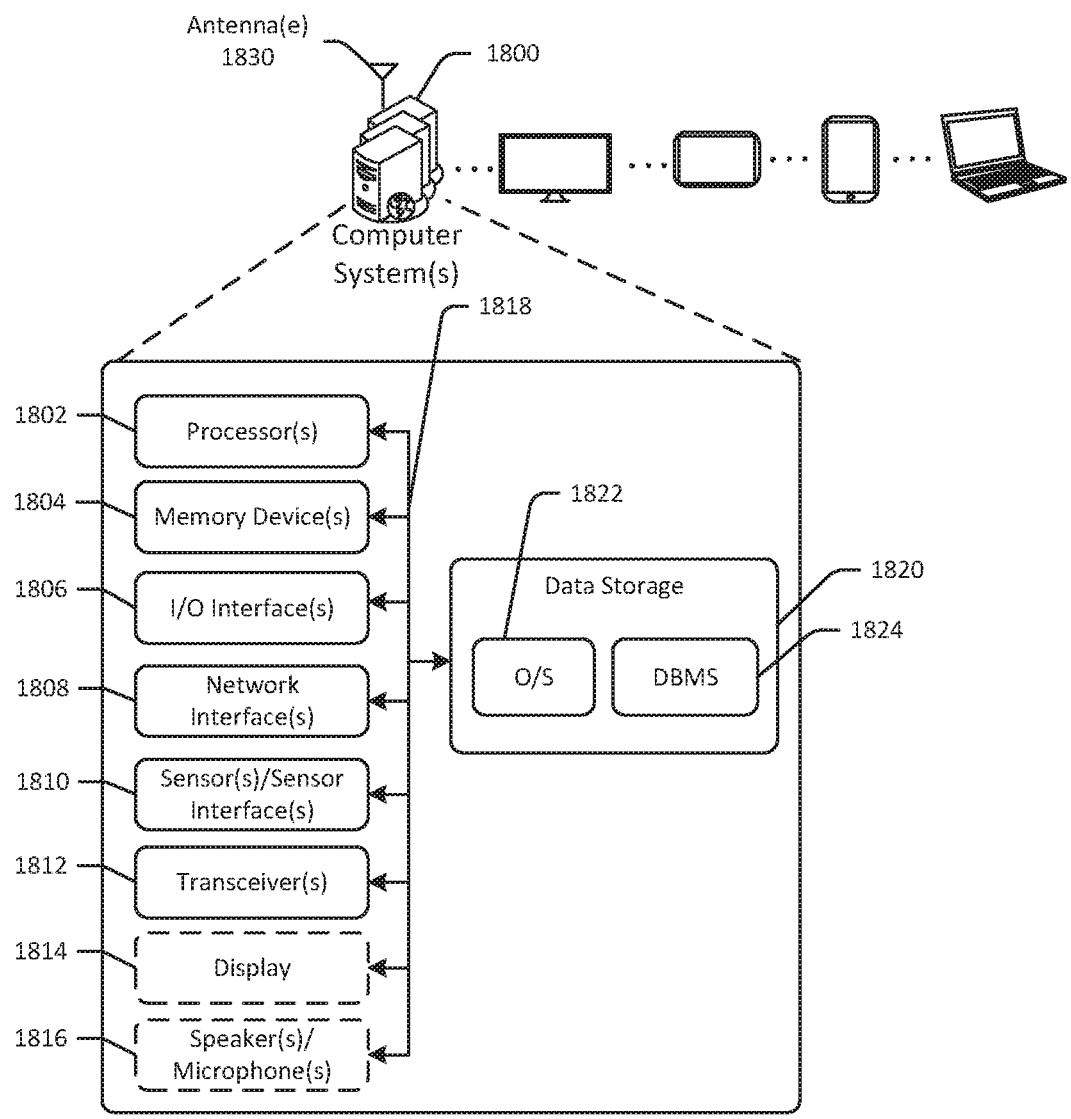
FIG. 18 schematically illustrates an example architecture of a computer system associated with an item sorting system in accordance with one or more embodiments of the disclosure.

FIG. 18 is a schematic block diagram of one or more illustrative computer system(s) 1800 in accordance with one or more example embodiments of the disclosure. The computer system(s) 1800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 1800 may correspond to an illustrative device configuration for a computer system used in conjunction with the system(s) of FIGS. 1-17.

The computer system(s) 1800 may be configured to communicate with one or more servers, user devices, or the like. The computer system(s) 1800 may be configured to cause the sortation system(s) to sort items into one or more flexible containers.

The computer system(s) 1800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 1800 may include one or more processors (processor(s)) 1802, one or more memory devices 1804 (also referred to herein as memory 1804), one or more input/output (I/O) interface(s) 1806, one or more network interface(s) 1808, one or more sensor(s) or sensor interface(s) 1810, one or more transceiver(s) 1812, one or more optional display(s) 1814, one or more optional microphone(s) 1816, and data storage 1820. The computer system(s) 1800 may further include one or more bus(es) 1818 that functionally couple various components of the computer system(s) 1800. The computer system(s) 1800 may further include one or more antenna(e) 1830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1818 may include at least one of a system bus, a memory bus, an address bus, or a message bus, and may permit the exchange of information (e.g., data (including computer-executable code), signaling, etc.) between various components of the computer system(s) 1800. The bus(es) 1818 may include, without limitation, a memory bus or a memory controller, a peripheral bus, an accelerated graphics port, and so forth. The bus(es) 1818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1804 of the computer system(s) 1800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1820 may include removable storage and/or non-removable storage including, but not limited to, magnetic storage, optical disk storage, and/or tape storage. The data storage 1820 may provide non-volatile storage of computer-executable instructions and other data. The memory 1804 and the data storage 1820, removable and/or non-removable, are examples of computer-readable storage media (CRSM) as that term is used herein.

The data storage 1820 may store computer-executable code, instructions, or the like that may be loadable into the memory 1804 and executable by the processor(s) 1802 to cause the processor(s) 1802 to perform or initiate various operations. The data storage 1820 may additionally store data that may be copied to the memory 1804 for use by the processor(s) 1802 during the execution of the computer-executable instructions. Moreover, output data generated as a result of execution of the computer-executable instructions by the processor(s) 1802 may be stored initially in the memory 1804, and may ultimately be copied to the data storage 1820 for non-volatile storage.

More specifically, the data storage 1820 may store one or more operating systems (O/S) 1822; one or more database management systems (DBMS) 1824; and one or more program module(s), applications, engines, computer-executable code, scripts, or the like. Some or all of these module(s) may be sub-module(s). Any of the components depicted as being stored in the data storage 1820 may include any combination of software, firmware, and/or hardware. The software and/or firmware may include computer-executable code, instructions, or the like that may be loaded into the memory 1804 for execution by one or more of the processor(s) 1802. Any of the components depicted as being stored in the data storage 1820 may support functionality described in reference to corresponding components named earlier in this disclosure.

The data storage 1820 may further store various types of data utilized by the components of the computer system(s) 1800. Any data stored in the data storage 1820 may be loaded into the memory 1804 for use by the processor(s) 1802 in executing computer-executable code. In addition, any data depicted as being stored in the data storage 1820 may potentially be stored in one or more datastore(s) and may be accessed via the DBMS 1824 and loaded in the memory 1804 for use by the processor(s) 1802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1802 may be configured to access the memory 1804 and execute the computer-executable instructions loaded therein. For example, the processor(s) 1802 may be configured to execute the computer-executable instructions of the various program module(s), applications, engines, or the like of the computer system(s) 1800 to cause or facilitate various operations to be performed in accordance with one or more embodiments of the disclosure. The processor(s) 1802 may include any suitable processing unit capable of accepting data as input, processing the input data in accordance with stored computer-executable instructions, and generating output data. The processor(s) 1802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1802 may be capable of supporting any of a variety of instruction sets.

Referring now to other illustrative components depicted as being stored in the data storage 1820, the O/S 1822 may be loaded from the data storage 1820 into the memory 1804 and may provide an interface between other application software executing on the computer system(s) 1800 and the hardware resources of the computer system(s) 1800. More specifically, the O/S 1822 may include a set of computer-executable instructions for managing the hardware resources of the computer system(s) 1800 and for providing common services to other application programs (e.g., managing memory allocation among various application programs). In certain example embodiments, the O/S 1822 may control execution of the other program module(s). The O/S 1822 may include any operating system now known or which may be developed in the future including, but not limited to, any server operating system, any mainframe operating system, or any other proprietary or non-proprietary operating system.

The DBMS 1824 may be loaded into the memory 1804 and may support functionality for accessing, retrieving, storing, and/or manipulating data stored in the memory 1804 and/or data stored in the data storage 1820. The DBMS 1824 may use any of a variety of database models (e.g., relational model, object model, etc.) and may support any of a variety of query languages. The DBMS 1824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 1800 is a mobile device, the DBMS 1824 may be any suitable lightweight DBMS optimized for performance on a mobile device.

Referring now to other illustrative components of the computer system(s) 1800, the input/output (I/O) interface(s) 1806 may facilitate the receipt of input information by the computer system(s) 1800 from one or more I/O devices as well as the output of information from the computer system(s) 1800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 1800 or may be separate. The I/O devices may further include, for example, any number of peripheral devices such as data storage devices, printing devices, and so forth.

The I/O interface(s) 1806 may also include an interface for an external peripheral device connection such as universal serial bus (USB), FireWire, Thunderbolt, Ethernet port or other connection protocol that may connect to one or more networks. The I/O interface(s) 1806 may also include a connection to one or more of the antenna(e) 1830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 1800 may further include one or more network interface(s) 1808 via which the computer system(s) 1800 may communicate with any of a variety of other systems, platforms, networks, devices, and so forth. The network interface(s) 1808 may enable communication, for example, with one or more wireless routers, one or more host servers, one or more web servers, and the like via one or more networks.

The antenna(e) 1830 may include any suitable type of antenna depending, for example, on the communications protocols used to transmit or receive signals via the antenna (e) 1830. Non-limiting examples of suitable antennae may include directional antennae, non-directional antennae, dipole antennae, folded dipole antennae, patch antennae, multiple-input multiple-output (MIMO) antennae, or the like. The antenna(e) 1830 may be communicatively coupled to one or more transceivers 1812 or radio components to which or from which signals may be transmitted or received.

As previously described, the antenna(e) 1830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1830 may be configured to transmit or receive radio frequency signals within any suitable frequency range forming part of the unlicensed portion of the radio spectrum.

The antenna(e) 1830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1812 may include any suitable radio component(s) for—in cooperation with the antenna(e) 1830—transmitting or receiving radio frequency (RF) signals in the bandwidth and/or channels corresponding to the communications protocols utilized by the computer system(s) 1800 to communicate with other devices. The transceiver(s) 1812 may include hardware, software, and/or firmware for modulating, transmitting, or receiving—potentially in cooperation with any of antenna(e) 1830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1812 may further include hardware, firmware, or software for receiving GNSS signals. The transceiver(s) 1812 may include any known receiver and baseband suitable for communicating via the communications protocols utilized by the computer system(s) 1800. The transceiver(s) 1812 may further include a low noise amplifier (LNA), additional signal amplifiers, an analog-to-digital (A/D) converter, one or more buffers, a digital baseband, or the like.

The sensor(s)/sensor interface(s) 1810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 1814 may be configured to output light and/or render content. The optional speaker(s)/microphone(s) 1816 may be any device configured to receive analog sound input or voice data.

It should be appreciated that the program module(s), applications, computer-executable instructions, code, or the like depicted in FIG. 18 as being stored in the data storage 1820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 1800, and/or hosted on other computing device(s) accessible via one or more networks, may be provided to support functionality provided by the program module(s), applications, or computer-executable code depicted in FIG. 18 and/or additional or alternate functionality. Further, functionality may be modularized differently such that processing described as being supported collectively by the collection of program module(s) depicted in FIG. 18 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 18 may be implemented, at least partially, in hardware and/or firmware across any number of devices.

It should further be appreciated that the computer system(s) 1800 may include alternate and/or additional hardware, software, or firmware components beyond those described or depicted without departing from the scope of the disclosure. More particularly, it should be appreciated that software, firmware, or hardware components depicted as forming part of the computer system(s) 1800 are merely illustrative and that some components may not be present or additional components may be provided in various embodiments. While various illustrative program module(s) have been depicted and described as software module(s) stored in the data storage 1820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-17 may be performed by a device having the illustrative configuration depicted in FIG. 18, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-17 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-17 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An item sorting system comprising:
an induction portion at which a first item is inducted into the item sorting system;
a shuttle configured to transport the first item from the induction portion of the item sorting system;
a support frame that forms a path through which the shuttle is configured to move, wherein the path is an internal path through the item sorting system;
a first chute assembly coupled to the item sorting system, wherein the chute assembly is configured to pivot from a first position to a second position with respect to the support frame, the first chute assembly comprising:
a first planar ramp;
a second planar ramp coupled to the first planar ramp, wherein the second planar ramp is below the first planar ramp;
a first support on a first side of the first planar ramp;
a second support on a second side of the first planar ramp, wherein the first planar ramp is coupled to both the first support and the second support;
a first pneumatic lift component coupled to the first support and to the frame; and
a second pneumatic lift component coupled to the second support and to the frame;
wherein the first chute assembly is held in the second position when the first pneumatic lift component and the second pneumatic lift component are in a compressed configuration, and wherein the first chute assembly is in the first position when the first pneumatic lift component and the second pneumatic lift component are in an extended configuration.

2. The item sorting system of claim 1, further comprising:
a second chute assembly disposed adjacent to the first chute assembly; and
a third chute assembly disposed adjacent to the second chute assembly.

3. The item sorting system of claim 1, further comprising:
a moveable cart disposed adjacent to the first chute assembly, the moveable cart comprising:
a plurality of containers arranged in container slots; and
a foot brake disposed at a front end of the moveable cart.

4. The item sorting system of claim 3, further comprising:
a backstop configured to stop motion of the moveable cart; and
a switch configured to automatically trigger package delivery down the chute assembly when the moveable cart is positioned underneath the first chute assembly.

5. An item sorting system comprising:
a frame; and
a chute assembly coupled to the frame, wherein the chute assembly is configured to pivot from a first position to a second position with respect to the frame, the chute assembly comprising:
a first planar ramp;
a first support on a first side of the first planar ramp;
a second support on a second side of the first planar ramp, wherein the first planar ramp is coupled to both the first support and the second support;
a first pneumatic lift component coupled to the first support and to the frame; and
a second pneumatic lift component coupled to the second support and to the frame;
a second planar ramp disposed adjacent to the first planar ramp;
a third support on a first side of the second planar ramp;
a fourth support on a second side of the second planar ramp, wherein the second planar ramp is coupled to both the third support and the fourth support;
a first linking component coupled to the first support and the third support; and
a second linking component coupled to the second support and the fourth support;
wherein the chute assembly is held in the second position when the first pneumatic lift component and the second pneumatic lift component are in a compressed configuration, and wherein the chute assembly is in the first position when the first pneumatic lift component and the second pneumatic lift component are in an extended configuration; and
wherein the first pneumatic lift component and the second pneumatic lift component are configured to support both the first planar ramp and the second planar ramp, and wherein movement of the chute assembly from the first position to the second position comprises movement of both the first planar ramp and the second planar ramp.

6. The item sorting system of claim 5, wherein the item sorting system further comprises:
a third planar ramp disposed adjacent to the second planar ramp;
a fifth support on a first side of the third planar ramp; and
a sixth support on a second side of the third planar ramp, wherein the third planar ramp is coupled to both the fifth support and the sixth support;
wherein the third planar ramp has a fixed position.

7. The item sorting system of claim 5, wherein the second position is perpendicular to the frame.

8. The item sorting system of claim 5, wherein the item sorting system further comprises:
a moveable cart disposed adjacent to the chute assembly, the moveable cart comprising:
a plurality of containers arranged in container slots; and
a foot brake disposed at a front end of the moveable cart.

9. The item sorting system of claim 8, wherein the item sorting system further comprises:
a backstop configured to stop motion of the moveable cart; and
a switch configured to automatically trigger package delivery down the chute assembly when the moveable cart is positioned adjacent to the chute assembly.

10. The item sorting system of claim 8, wherein the item sorting system further comprises:
one or more guiderails configured to facilitate positioning of the moveable cart adjacent to the chute assembly.

11. The item sorting system of claim 5, wherein the chute assembly is a first chute assembly, the item sorting system further comprising:
a second chute assembly disposed adjacent to the first chute assembly.

12. The item sorting system of claim 5, wherein the chute assembly further comprises:
a handle coupled to the first support and the second support.

13. The item sorting system of claim 5, wherein the first support and the second support have a first length, and the first planar ramp has a second length that is less than the first length.

14. The item sorting system of claim 5, wherein the first planar ramp comprises a composite material.

15. A modular item sorting machine comprising:
a frame; and
a chute assembly coupled to the frame, wherein the chute assembly is configured to pivot from a first position to a second position with respect to the frame, the chute assembly comprising:
a first planar ramp coupled to the frame via a first hinge;
a second planar ramp coupled to the frame via a second hinge;
a third planar ramp coupled to the frame, wherein the third planar ramp has a fixed position;
a first support on a first side of the first planar ramp;
a second support on a second side of the first planar ramp, wherein the first planar ramp is coupled to both the first support and the second support;
a first pneumatic lift component coupled to the first support and to the frame; and
a second pneumatic lift component coupled to the second support and to the frame.

16. The modular item sorting machine of claim 15, wherein the chute assembly is held in the second position when the first pneumatic lift component and the second pneumatic lift component are in a compressed configuration, and wherein the chute assembly is in the first position when the first pneumatic lift component and the second pneumatic lift component are in an extended configuration.

17. The modular item sorting machine of claim 15, wherein the chute assembly further comprises:
a linking component between the first planar ramp and the second planar ramp, wherein the linking component causes the first planar ramp and the second planar ramp to move as a single unit.

18. The modular item sorting machine of claim 15, wherein the chute assembly further comprises:
a first vinyl flap adjacent to the first planar ramp; and
a second vinyl flap adjacent to the second planar ramp.

19. The modular item sorting machine of claim 15, wherein the first planar ramp, second planar ramp, and third planar ramp each comprise a composite material.

* * * * *